US012334684B2

(12) United States Patent
Yin et al.

(10) Patent No.: US 12,334,684 B2
(45) Date of Patent: Jun. 17, 2025

(54) HIGH SPEED PLUG CONNECTOR

(71) Applicant: Amphenol Commercial Products (Chengdu) Co., Ltd., Chengdu (CN)

(72) Inventors: Wenfeng Yin, Chengdu (CN); Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 350 days.

(21) Appl. No.: 17/848,851

(22) Filed: Jun. 24, 2022

(65) Prior Publication Data

US 2023/0125645 A1 Apr. 27, 2023

(30) Foreign Application Priority Data

Oct. 21, 2021 (CN) ........................ 202122538112.0

(51) Int. Cl.
*H01R 13/60* (2006.01)
*H01R 12/71* (2011.01)
(Continued)

(52) U.S. Cl.
CPC ....... *H01R 13/6471* (2013.01); *H01R 12/716* (2013.01); *H01R 24/60* (2013.01)

(58) Field of Classification Search
CPC ................ H01R 12/716; H01R 12/724; H01R 13/6461; H01R 13/6471; H01R 13/6477; H01R 24/60
See application file for complete search history.

(56) References Cited

U.S. PATENT DOCUMENTS 7,335,063 B2 2/2008 Cohen et al.
7,581,990 B2 9/2009 Kirk et al.
(Continued)

FOREIGN PATENT DOCUMENTS

CN 202585857 U 12/2012
CN 203205638 U 9/2013
(Continued)

OTHER PUBLICATIONS

[No Author Listed], SFF Committee SFF-8639 Specification for Multifunction 6X Unshielded Connector. Rev 2.1. Development. SNIA SFF TWG Technology Affiliate. May 26, 2017. 32 pages.
(Continued)

*Primary Examiner* — Abdullah A Riyami
*Assistant Examiner* — Thang H Nguyen
(74) *Attorney, Agent, or Firm* — Wolf, Greenfield & Sacks, P.C.

(57) ABSTRACT

A connector for use with high speed signals. The connector has a housing, which includes a base portion extending in a longitudinal direction and a tongue portion extending from the base portion in a mating direction perpendicular to the longitudinal direction. The housing has slots extending through the base portion to surfaces of the tongue portion and configured to hold terminals. The housing has a lossy material sized and shaped to couple with at least the portions of ground terminals held in the base portion along their lengths. The lossy material may protrude towards spaces between the portions of signal terminals held in the base portion along their lengths. The tail portions of the terminals may jog toward a plane that the lossy material extends. Such a connector may be used to meet signal integrity requirements in connectors designed for 64 Gbps and beyond.

23 Claims, 14 Drawing Sheets

(51) Int. Cl.
*H01R 13/00* (2006.01)
*H01R 13/6471* (2011.01)
*H01R 24/60* (2011.01)

(56) References Cited

U.S. PATENT DOCUMENTS

| | | | | |
|---|---|---|---|---|
| 8,462,502 | B2 | 6/2013 | Hirano et al. | |
| 8,585,440 | B2 | 11/2013 | Jiang et al. | |
| 8,702,451 | B2 | 4/2014 | Luo et al. | |
| 8,740,631 | B2 | 6/2014 | Chen | |
| 9,225,090 | B2 | 12/2015 | Chen | |
| 9,407,022 | B1 | 8/2016 | Wang | |
| 9,564,714 | B1 | 2/2017 | Wang et al. | |
| 9,941,641 | B1 | 4/2018 | Jiang et al. | |
| 9,985,391 | B1 | 5/2018 | Wang | |
| 10,283,910 | B1 * | 5/2019 | Chen | H01R 4/04 |
| 10,411,376 | B1 * | 9/2019 | Wang | H01R 13/502 |
| 10,651,589 | B1 | 5/2020 | Wang et al. | |
| 10,763,608 | B1 | 9/2020 | Wang et al. | |
| 11,251,554 | B1 * | 2/2022 | Tan | H01R 12/716 |
| 11,588,277 | B2 * | 2/2023 | Jiang | H01R 12/727 |
| 11,799,230 | B2 * | 10/2023 | Jiang | H01R 13/6461 |
| 2013/0273778 | A1 * | 10/2013 | Jiang | H01R 24/62 439/626 |
| 2014/0211389 | A1 | 7/2014 | Zhou et al. | |
| 2018/0062323 | A1 * | 3/2018 | Kirk | H01R 13/6594 |
| 2018/0205181 | A1 | 7/2018 | Chen et al. | |
| 2019/0214753 | A1 | 7/2019 | Jiang et al. | |
| 2020/0028289 | A1 * | 1/2020 | Dai | H01R 13/6595 |
| 2021/0135389 | A1 * | 5/2021 | Jiang | H01R 13/516 |
| 2021/0135404 | A1 * | 5/2021 | Jiang | H01R 12/724 |
| 2021/0399455 | A1 | 12/2021 | Wang et al. | |
| 2022/0077614 | A1 | 3/2022 | Tan et al. | |
| 2022/0102916 | A1 * | 3/2022 | Liu | H01R 43/20 |
| 2022/0302655 | A1 * | 9/2022 | Wang | H01R 13/6587 |
| 2022/0360000 | A1 * | 11/2022 | Tan | H01R 13/42 |
| 2023/0122686 | A1 * | 4/2023 | Wang | H01R 13/05 439/607.05 |

FOREIGN PATENT DOCUMENTS

| | | | |
|---|---|---|---|
| CN | 203850501 | U | 9/2014 |
| CN | 104283080 | A | 1/2015 |
| CN | 204376132 | U | 6/2015 |
| CN | 205016785 | U | 2/2016 |
| CN | 103887641 | B | 6/2016 |
| CN | 205944534 | U | 2/2017 |
| CN | 206962152 | U | 2/2018 |
| CN | 207116835 | U | 3/2018 |
| CN | 207517943 | U | 6/2018 |
| CN | 109004437 | A | 12/2018 |
| CN | 208284706 | U | 12/2018 |
| CN | 208433570 | U | 1/2019 |
| CN | 209675519 | U | 11/2019 |
| CN | 212380677 | U | 1/2021 |
| CN | 215816686 | U | 2/2022 |
| TW | I505580 | B | 10/2015 |
| TW | I509921 | B | 11/2015 |
| TW | M546036 | U | 7/2017 |
| TW | M563682 | U | 7/2018 |
| TW | M573906 | U | 2/2019 |
| TW | M584561 | U | 10/2019 |
| TW | M606366 | U | 1/2021 |
| TW | M618868 | U | 11/2021 |
| TW | M621514 | U | 12/2021 |

OTHER PUBLICATIONS

[No Author Listed], SFF-TA-1001 Specification for Universal x4 Link Definition for SFF-8639. Rev 1.1. SNIA Advance storage & information technology. May 28, 2018. 20 pages.

Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].

Tan et al., PSAS 5.0 Female Connector, U.S. Appl. No. 18/084,454, filed Dec. 19, 2022.

Wang et al., PCIE/SAS Connector Structure, U.S. Appl. No. 17/476,002, filed Sep. 15, 2021.

Wang et al., PCIE/SAS Female Connector, U.S. Appl. No. 18/076,066, filed Dec. 6, 2022.

Yin et al., High Speed Electrical Connector, U.S. Appl. No. 17/874,814, filed Jul. 27, 2022.

* cited by examiner

HIGH SPEED PLUG CONNECTOR

CROSS-REFERENCE TO RELATED APPLICATIONS

This application claims priority to and the benefit of Chinese Patent Application No. 202122538112.0, filed on Oct. 21, 2021, entitled "PLUG CONNECTOR," the entire contents of which are incorporated herein by reference in their entirety.

TECHNICAL FIELD

The present application generally to electrical connectors, such as those used to interconnect electronic assemblies.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known backplane is a PCB onto which many connectors may be mounted. Conducting traces in the backplane may be electrically connected to signal conductors in the connectors so that signals may be routed between the connectors. Signals may be routed among daughtercards through the connectors and the backplane. For example, daughtercards may also have connectors mounted thereon. The connectors mounted on a daughtercard may be plugged into the connectors mounted on the backplane.

A known arrangement for joining several printed circuit boards is to have one printed circuit board serve as a backplane. Other printed circuit boards, called "daughterboards," "daughtercards," or "midboards" may be connected through the backplane. A backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards. Sometimes, one or more smaller printed circuit boards may be connected to another larger printed circuit board. In such a configuration, the larger printed circuit board may be called a "motherboard" and the printed circuit boards connected to it may be called daughterboards. Also, boards of the same size or similar sizes may sometimes be aligned in parallel. Connectors used in these applications are often called "stacking connectors" or "mezzanine connectors."

For example, this configuration is often used in computers in which the motherboard might be implemented with a processor and a bus configured to pass data between the processor and peripherals, such as a graphics processor or memory. Connectors may be mounted to the motherboard and connected to the bus. The peripherals may be implemented on separate PCBs with connectors that mate with the connectors on the bus such that separately manufactured peripherals may be readily integrated into a computer made with the motherboard.

To enhance the availability of peripherals, the bus and the connectors used to physically connect peripherals via the bus may be standardized. In this way, there may be a large number of peripherals available from a multitude of manufacturers. All of those products, so long as they are compliant with the standard, may be used in a computer that has a bus compliant with the standard. Examples of such standards include serial ATA (SATA), serial attached SCSI (SAS), and peripheral component interconnect express (PCIe), which are commonly used in computers. The standards have gone through multiple revisions, adapting to the higher performance expected from computers over time.

Electrical connectors may be used to provide electrical connections between different electronic systems through conductive terminals so as to enable signal and/or power transfer. One typical type of electrical connectors is a "storage drive connector" that is configured to provide an industry standard interface such as SFF-8639 to establish an electrical connection between a storage drive (such as a hard disk drive (HDD), a solid state drive (SSD), an optical disk drive (ODD)) and a circuit board (such as a backplane, a midplane, a drive carrier board). Such electrical connector typically includes a plug connector and a receptacle connector mated with each other. The plug connector is configured for mounting to the circuit board, and the receptacle connector is configured for connecting the storage drive to the plug connector. In this way, the electrical connector composed of the plug connector and the receptacle connector is capable of establishing an electrical connection between the storage driver and the circuit board so as to enable signal and/or power transfer.

An insulative housing of the plug connector generally includes a base portion and a tongue portion extending from the base portion and configured to be plugged into the receptacle connector. A plurality of conductive terminals of the plug connector are held in the insulative housing with contact portions thereof exposed through an outer surface of the tongue portion. In the prior art, a recess is typically formed at the tongue portion and recessed from the outer surface into the tongue portion, and a prefabricated insert made of a lossy material is subsequently disposed in the recess. The prefabricated insert is configured to be electrically coupled to at least some of the ground terminals of the plurality of conductive terminals so as to reduce electrical resonance and other problems that may interfere with the signal, thereby reducing crosstalk.

In addition, as electronic systems become smaller and function more complexly, increasing numbers of electronic components need to be arranged in the electronic system, and plug connectors often take up much space in the electronic systems.

BRIEF SUMMARY

Aspects of the present application relate to high speed plug connectors.

Some embodiments relate to an electrical connector. The electrical connector may include a housing comprising a base portion extending in a longitudinal direction, a tongue portion extending from the base portion in a mating direction perpendicular to the longitudinal direction, and a plurality of slots extending through the base portion to surfaces of the tongue portion; a plurality of conductive elements each held by one slot of the plurality of slots of the housing, the plurality of conductive elements comprising signal conductors and ground conductors; and a lossy material disposed in the housing and coupled to the ground conductors, wherein the lossy material spans a joint between the base portion and the tongue portion.

In some embodiments, the lossy material may be molded to the housing in the joint between the base portion and the tongue portion.

In some embodiments, the plurality of conductive elements may each comprise a first portion extending in the mating direction and disposed on the surfaces of the tongue portion, a second portion opposite the first portion and extending out of the base portion, and a third portion extending between the first portion and the second portion, and the lossy material is coupled to at least part of the first portions of the ground conductors.

In some embodiments, the plurality of conductive elements may each comprise a contact portion extending in the mating direction and held by the tongue portion, a tail portion opposite the contact portion and extending out of the base portion, and an intermediate portion extending between the contact portion and the tail portion. For each conductive element, the intermediate portion may comprise a first section held in the base portion and a second section held by the tongue portion. The lossy material may be coupled to both the first sections and second sections of the ground conductors.

In some embodiments, the lossy material may be coupled to the ground conductors along the entire length of the base portion in the mating direction.

In some embodiments, the plurality of slots of the housing may comprise a first row of slots disposed along a first surface of the tongue portion and a second row of slots disposed along a second surface of the tongue portion, the second surface opposite the first surface. The housing may comprise a chamber disposed between the first row of slots and the second row of slots. The lossy material may be disposed in the chamber.

In some embodiments, the tongue portion of the housing may comprise a platform comprising a raised surface. The lossy material may comprise a corresponding platform such that the lossy material is brought closer to the conductive elements held in the slots extending on the raised surface of the platform of the tongue portion of the housing than without the corresponding platform of the lossy material.

In some embodiments, the signal conductors may be disposed in pairs separated by the ground conductors. The lossy material may comprise portions protruding towards spaces between the signal conductors of the pairs.

Some embodiments may relate to an electrical connector. The electrical connector may include a housing comprising a base portion extending in a longitudinal direction, a tongue portion extending from the base portion in a mating direction perpendicular to the longitudinal direction, and a plurality of slots extending through the base portion to surfaces of the tongue portion; a plurality of conductive elements each held by one slot of the plurality of slots of the housing, the plurality of conductive elements comprising a plurality of pairs of signal conductors separated by ground conductors; and a lossy material disposed in the housing, wherein, for each pair of signal conductors, the lossy material comprises a portion protruding towards a space between the signal conductors of the pair.

In some embodiments, the lossy material may span a joint between the base portion and the tongue portion.

In some embodiments, the lossy material may be molded to the housing in the joint between the base portion and the tongue portion.

In some embodiments, for each pair of signal conductors, the portion of the lossy material protruding towards the space between the signal conductors of the pair may extend along the entire length of the base portion in the mating direction.

In some embodiments, for each pair of signal conductors, the portion of the lossy material protruding towards the space between the signal conductors of the pair may have a dovetail-shaped cross-section.

In some embodiments, the lossy material may comprise protrusions elongating in the mating direction and coupled to the ground conductors.

In some embodiments, the portions of the lossy material protruding towards the spaces between the signal conductors of the pairs may be disposed between the protrusions coupled to the ground conductors.

In some embodiments, the portions of the lossy material protruding towards the spaces between the signal conductors of the pairs are shorter than the protrusions coupled to the ground conductors in the mating direction.

Some embodiments relate to an electrical connector. The electrical connector may include a housing comprising a base portion extending in a longitudinal direction, a tongue portion extending from the base portion in a mating direction perpendicular to the longitudinal direction; and a plurality of conductive elements each comprising a contact portion extending in the mating direction and a tail portion opposite the contact portion and extending out of the base portion, the plurality of conductive elements comprising a first plurality of conductive elements and a second plurality of conductive elements. The tail portions of the first plurality of conductive elements may jog towards the second plurality of conductive elements. The tail portions of the second plurality of conductive elements may jog towards the first plurality of conductive elements.

In some embodiments, the tail portions of the plurality of conductive elements may comprise mounting surfaces aligned on a same plane.

In some embodiments, the plurality of conductive elements may each comprise an intermediate portion extending between the contact portion and the tail portion. For each of the plurality of conductive elements, the tail portion may comprise a straight section extending from the intermediate portion, an end section comprising the mounting surface, and a transition section extending between the straight section and the end section.

In some embodiments, the transition sections of the plurality of conductive elements may be of a same length.

In some embodiments, the housing may comprise a first row of slots extending through the base portion to a first surface of the tongue portion, and a second row of slots extending through the base portion to a second surface of the tongue portion. The first plurality of conductive elements each may be disposed in one slot of the first row of slots and the second plurality of conductive elements each may be disposed in one slot of the second row of slots.

In some embodiments, the connector may include a lossy material disposed in the housing and elongating in the longitudinal direction between the first plurality of conductive elements and the second plurality of conductive elements.

In some embodiments, the lossy material may comprise protrusions towards the first plurality of conductive elements and protrusions towards the second plurality of conductive elements.

In some embodiments, the lossy material may comprise protrusions coupled to selected ones of the first plurality of conductive elements and portions protruding to spaces between adjacent ones of the first plurality of conductive elements.

In some embodiments, the tongue portion of the housing may comprise a platform comprising a raised surface. The contact portions of selected ones of the first plurality of conductive elements may be disposed on the raised surface.

Some embodiments relate to an electrical connector. The electrical connector may include a housing comprising a base portion extending in a longitudinal direction, a tongue portion extending from the base portion in a mating direction perpendicular to the longitudinal direction, and a plurality of slots extending through the base portion to surfaces of the tongue portion; a plurality of conductive elements each held by one slot of the plurality of slots of the housing, the plurality of conductive elements comprising signal conductors and ground conductors; and a lossy material disposed in the housing at a joint between the based portion and the tongue portion such that the housing is reinforced.

In some embodiments, the lossy material may be molded to the housing to span the joint between the base portion and the tongue portion.

In some embodiments, the plurality of conductive elements may each comprise a first portion extending in the mating direction and disposed on the surfaces of the tongue portion, a second portion opposite the first portion and extending out of the base portion, and a third portion extending between the first portion and the second portion. The lossy material is coupled to both the first portions and the third portions of the ground conductors.

In some embodiments, the tongue portion of the housing may comprise a platform comprising a raised surface. The lossy material may comprise a corresponding platform such that the lossy material is brought closer to the conductive elements held in the slots extending on the raised surface of the platform of the tongue portion of the housing than without the corresponding platform of the lossy material.

According to an aspect of the present application, a plug connector for establishing an electrical connection between a circuit board and a receptacle connector is provided. The plug connector comprises: an insulative housing including a base portion extending in a longitudinal direction and a tongue portion extending from the base portion in a mating direction perpendicular to the longitudinal direction and configured to be plugged into the receptacle connector; a plurality of conductive terminals, each of the plurality of conductive terminals held in the insulative housing, with a contact portion thereof extending in the mating direction and being exposed through an outer surface of the tongue portion for establishing an electrical connection with a corresponding conductive terminal of the receptacle connector and with a tail portion thereof extending out of a side of the base portion opposite to the tongue portion for mounting to the circuit board, the plurality of conductive terminals including ground terminals; and a lossy material disposed in the insulative housing, the lossy material extending at least in the base portion and electrically coupled to at least some of the ground terminals of the plurality of conductive terminals.

In some embodiments, the lossy material comprises a plurality of protrusions extending towards the at least some ground terminals, and the lossy material is electrically coupled to a corresponding one of the at least some ground terminals through each of the plurality of protrusions.

In some embodiments, each of the plurality of conductive terminals further comprises an intermediate portion extending between the contact portion and the tail portion and at least partially retained in the base portion, and each of the plurality of protrusions is electrically coupled to the intermediate portion of a corresponding one of the at least some ground terminals.

In some embodiments, the protrusion is in direct contact with the intermediate portion.

In some embodiments, at least a first section of the intermediate portion is retained in the base portion and the protrusion is in direct contact with at least the exposed first section of the intermediate portion.

In some embodiments, the tongue portion comprises a plurality of terminal slots recessed from the outer surface, a second section of the intermediate portion and the contact portion of each of the plurality of conductive terminals are received in a corresponding one of the plurality of terminal slots, the lossy material extends from the base portion into the tongue portion, and a portion of the protrusion is exposed at the bottom of the terminal slot and in direct contact with the second section of the intermediate portion.

In some embodiments, each of the plurality of conductive terminals further comprises a reduced head extending from the contact portion opposite to the intermediate portion in the mating direction, the reduced head is received in the terminal slot, the reduced head is provided with steps on both sides thereof along the mating direction, and both side walls of each of the plurality of terminal slots are provided with protruding portions configured to abut against the steps of the reduced head of a corresponding conductive terminal to prevent the corresponding conductive terminal from buckling.

In some embodiments, the protrusion is disposed sufficiently close to the intermediate portion to capacitively couple with the intermediate portion.

In some embodiments, the protrusion is spaced from the intermediate portion by the insulative housing.

In some embodiments, the lossy material extends from the base portion to the tongue portion.

In some embodiments, the lossy material is a piece of lossy material injection-molded into the insulative housing.

In some embodiments, the lossy material is a single piece of lossy material and couples all of the ground terminals of the plurality of conductive terminals together.

In some embodiments, the lossy material comprises multiple pieces of lossy material, and wherein each of the multiple pieces of lossy material couples a corresponding portion of the ground terminals of the plurality of conductive terminals together.

In some embodiments, the plurality of conductive terminals further comprises signal terminals, and the plurality of conductive terminals are arranged to be a first set of conductive terminals and a second set of conductive terminals spaced apart from each other, each set of the first set of conductive terminals and the second set of conductive terminals comprises ground terminals and a plurality of pairs of signal terminals, each pair of the plurality of pairs of signal terminals constitutes a differential signal pair, the ground terminals separates the plurality of pairs of signal terminals from each other, the outer surface of the tongue portion comprises a first outer surface and a second outer surface opposite to the first outer surface, the contact portion of each conductive terminal in the first set of conductive terminals is exposed through the first outer surface, and the contact portion of each conductive terminal in the second set of conductive terminals is exposed through the second outer surface.

In some embodiments, each of the plurality of conductive terminals further comprises an intermediate portion extending between the contact portion and the tail portion and at least partially retained in the base portion, the lossy material extends between the first set of conductive terminals and the second set of conductive terminals and comprises a plurality of first protrusions extending towards the ground terminals in the first set of conductive terminals and a plurality of second protrusions extending towards the ground terminals in the second set of conductive terminals, each of the plurality of first protrusions is electrically coupled with the intermediate portion of a corresponding one of the ground terminals in the first set of conductive terminals, and each of the plurality of second protrusions is electrically coupled with the intermediate portion of a corresponding one of the ground terminals in the second set of conductive terminals.

In some embodiments, the plurality of first protrusions are offset from the plurality of second protrusions in the longitudinal direction.

In some embodiments, the lossy material electrically couples at least some of the ground terminals in the first set of conductive terminals with at least some of the ground terminals in the second set of conductive terminals.

In some embodiments, the lossy material comprises a plurality of third protrusions and a plurality of fourth protrusions, each of the plurality of third protrusions extends towards a space between the intermediate portions of each pair of the plurality of pairs of signal terminals in the first set of conductive terminals, and each of the plurality of fourth protrusions extends towards a space between the intermediate portions of each pair of the plurality of pairs of signal terminals in the second set of conductive terminals, wherein each of the plurality of third protrusions does not extend to a position between the intermediate portions of each pair of the plurality of pairs of signal terminals in the first set of conductive terminals and each of the plurality of fourth protrusions does not extend to a position between the intermediate portions of each pair of the plurality of pairs of signal terminals in the second set of conductive terminals, each of the plurality of third protrusions and the plurality of fourth protrusions forms an interlocking mechanism with the insulative housing.

In some embodiments, each of the plurality of third protrusions and the plurality of fourth protrusions is elongated in the mating direction and has a dovetail-shaped cross-section.

In some embodiments, the tongue portion further comprises a first platform protruding from the first outer surface of the tongue portion, the first platform defines a first platform surface parallel to the first outer surface, the first set of conductive terminals comprises a first subset of conductive terminals and a second subset of conductive terminals, the contact portion of each conductive terminal in the first subset of conductive terminals is exposed through the first platform surface, the conductive terminals in the first subset of conductive terminals and the conductive terminals in the second subset of conductive terminals are respectively aligned along the longitudinal direction.

In some embodiments, the lossy material is electrically coupled to the ground terminals in the second subset of conductive terminals.

In some embodiments, the second subset of conductive terminals is divided into at least two parts by the first platform and the lossy material comprises a plurality pieces of lossy material, each of the plurality pieces of lossy material is electrically coupled to the ground terminals in a corresponding one of the at least two parts.

In some embodiments, each of the first outer surface and the second outer surface is parallel to the longitudinal direction and the mating direction.

In some embodiments, the tail portion of each conductive terminal in the first set of conductive terminals and the tail portion of each conductive terminal in the second set of conductive terminals are configured to deflect towards a plane between the first set of conductive terminals and the second set of conductive terminals, respectively, such that end sections of the tail portion of each conductive terminal in the first set of conductive terminals and the tail portion of each conductive terminal in the second set of conductive terminals are configured for mounting to the circuit board are in the same plane.

In some embodiments, the tail portion of each of the plurality of conductive terminals comprises the end section, a straight section extending parallelly from the intermediate section, and a transition section transitioning from the straight section to the end section, the end section is parallel to the straight section and offset from the straight section, the straight section and the end section of the tail portion of each conductive terminal in the first set of conductive terminals define a first central axis and a second central axis, respectively, the straight section and the end section of the tail portion of each conductive terminal in the second set of conductive terminals define a third central axis and a fourth central axis, respectively, the second central axis and the fourth central axis are coplanar in a plane parallel to the longitudinal direction and the mating direction, a central separation between the first central axis and the third central axis is greater than a distance between the first central axis and the second central axis and greater than a distance between the third central axis and the fourth central axis.

According to another aspect of the present invention, a plug connector for establishing an electrical connection between a circuit board and a receptacle connector is provided. The plug connector comprises: an insulative housing comprising a base portion extending in a longitudinal direction, a tongue portion extending from the base portion in a mating direction perpendicular to the longitudinal direction and configured to be plugged into the receptacle connector, and a chamber formed in the insulative housing; and a plurality of conductive terminals, each of the plurality of conductive terminals comprising a contact portion, a tail portion and an intermediate portion extending between the contact portion and the tail portion, each of the plurality of conductive terminals held in the insulative housing, with the contact portion thereof extending in the mating direction and exposed through an outer surface of the tongue portion for establishing an electrical connection with a corresponding conductive terminal of the receptacle connector, and with the tail portion thereof extending from a side of the base portion opposite to the tongue portion for mounting to the circuit board; wherein the plurality of conductive terminals are arranged to be a first set of conductive terminals and a second set of conductive terminals spaced apart from each other, the tail portion of each conductive terminal in the first set of conductive terminals and the tail portion of each conductive terminal in the second set of conductive terminals are configured to deflect towards a plane between the first set of conductive terminals and the second set of conductive terminals, respectively, such that end sections of the tail portion of each conductive terminal in the first set of conductive terminals and the tail portion of each conductive terminal in the second set of conductive terminals are configured for mounting to the circuit board are in the same plane.

In some embodiments, the tail portion of each of the plurality of conductive terminals comprises the end section, a straight section extending parallelly from the intermediate section, and a transition section transitioning from the straight section to the end section, the end section is parallel to the straight section and offset from the straight section, the straight section and the end section of the tail portion of each conductive terminal in the first set of conductive terminals define a first central axis and a second central axis, respectively, the straight section and the end section of the tail portion of each conductive terminal in the second set of conductive terminals define a third central axis and a fourth central axis, respectively, the second central axis and the fourth central axis are coplanar in a plane parallel to the longitudinal direction and the mating direction, a central separation between the first central axis and the third central axis greater than a distance between the first central axis and the second central axis and greater than a distance between the third central axis and the fourth central axis.

In some embodiments, the central separation between the first central axis and the third central axis is equal to the sum of the distance between the first central axis and the second central axis plus the distance between the third central axis and the fourth central axis.

In some embodiments, the insulative housing further comprises at least one mounting platform extending from the base portion opposite to the tongue portion in the mating direction, each of the at least one mounting platform has a mounting surface configured for mounting to the circuit board, the mounting surface is co-planar with surfaces of the end section of the tail portion of each conductive terminal in the first set of conductive terminals and the end section of the tail portion of each conductive terminal in the second set of conductive terminals facing a mounting direction, the mounting direction is perpendicular to the mating direction and the longitudinal direction.

In some embodiments, the plug connector further comprises a lossy material disposed in the insulative housing, the lossy material extends at least in the base portion between the first set of conductive terminals and the second set of conductive terminals and is electrically coupled to at least some of the ground terminals of the plurality of conductive terminals.

In some embodiments, the lossy material electrically couples at least some of the ground terminals in the first set of conductive terminals with at least some of the ground terminals in the second set of conductive terminals.

In some embodiments, the end sections of the tail portions of one set of the first set of conductive terminals and the second set of terminals are closer to the lossy material than the end sections of the tail portions of the other set.

In some embodiments, the lossy material extends to a first side of the base portion, and the tail portions extends out of the first side.

In some embodiments, the lossy material extends from the base portion into the tongue portion.

In some embodiments, the lossy material is a piece of lossy material injection-molded into the insulative housing.

These techniques may be used alone or in any suitable combination. The foregoing summary is provided by way of illustration and is not intended to be limiting.

BRIEF DESCRIPTION OF DRAWINGS

The above and other aspects of the present application will be more thoroughly understood and appreciated below when read in conjunction with the appended drawings. It should be noted that the appended drawings are only schematic and are not drawn to scale. In the appended drawings.

LIST OF REFERENCE NUMERALS

Figure 1:
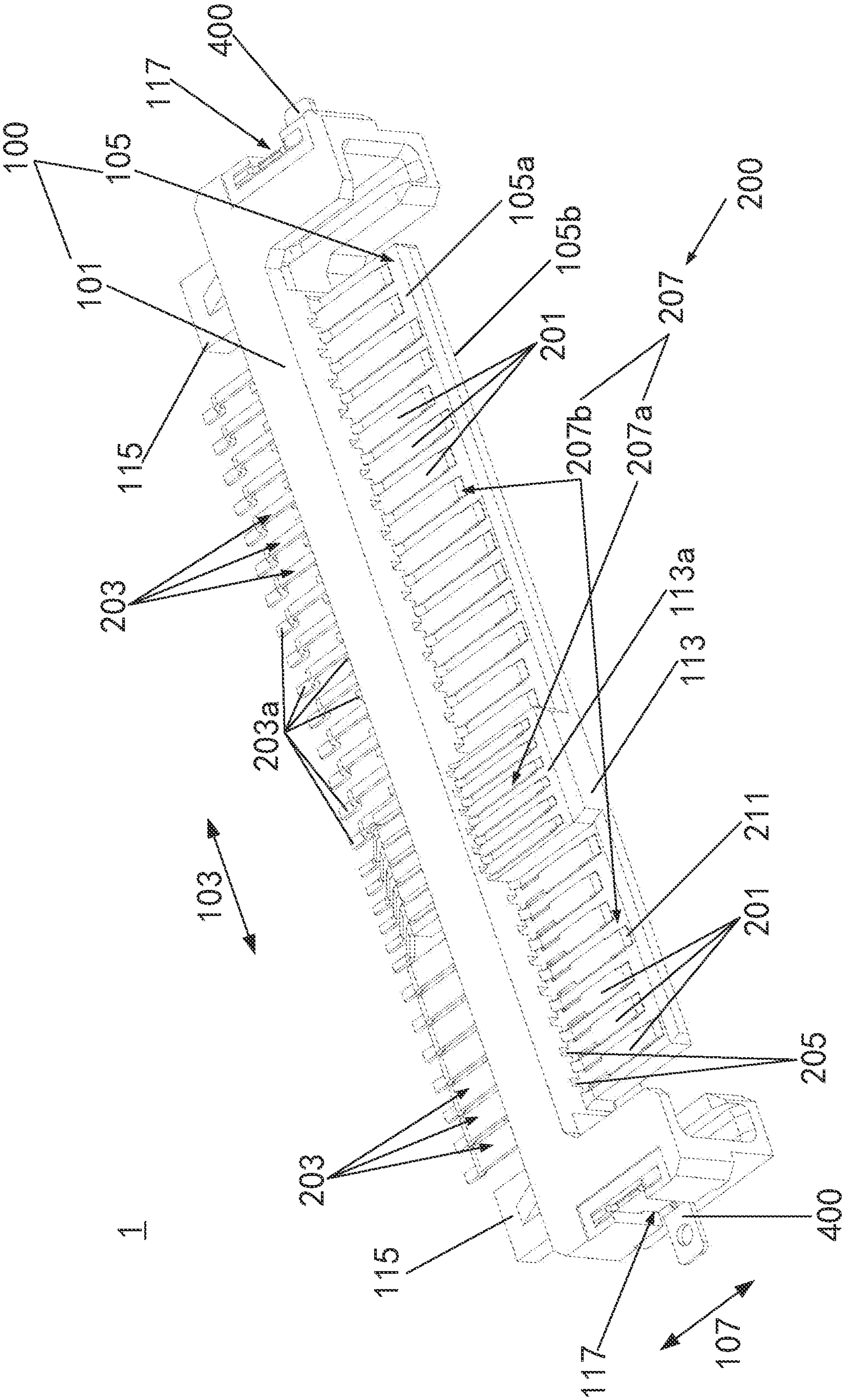
FIG. 1 is a perspective view of a plug connector viewed from the front upper direction according to some embodiments.
Figure 2:
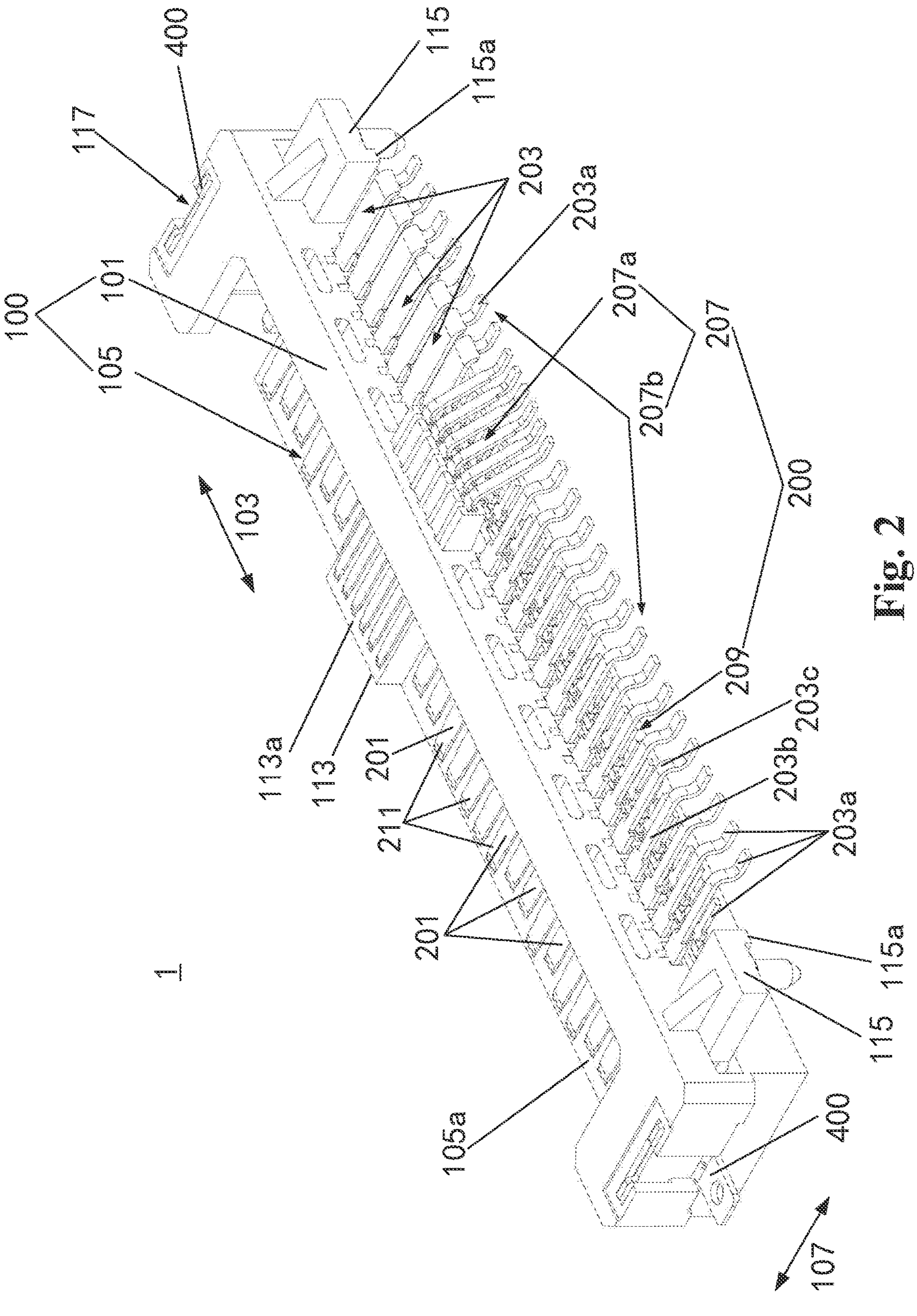
FIG. 2 is another perspective view of the plug connector of FIG. 1 viewed from the rear upper direction.
Figure 3:
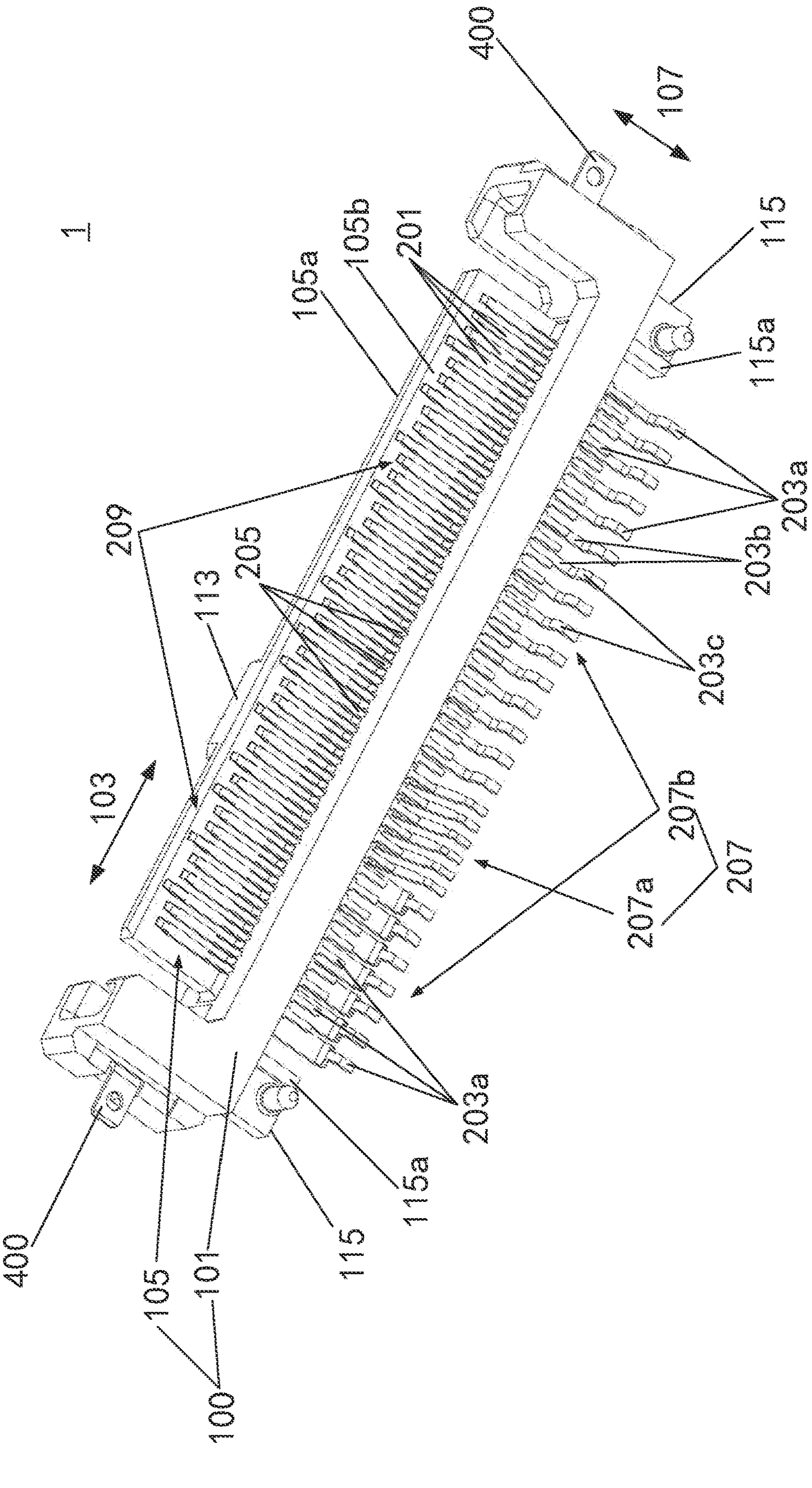
FIG. 3 is yet another perspective view of the plug connector of FIG. 1 viewed from the left below direction.

1 plug connector
100 insulative housing
101 base portion
103 longitudinal direction
105 tongue portion
105*a* first outer surface
105*b* second outer surface
107 mating direction
109 chamber
111 terminal slot
111*a* protruding portion
113 first platform

113*a* first platform surface
115 mounting platform
115*a* mounting surface
117 mount receiving portion
200 terminal
200*a* ground terminal
200*b* signal terminal
201 contact portion
203 tail portion
203*a* end section
203*b* straight section
203*c* transitional section
205 intermediate portion
205*a* first section
205*b* second section
207 first set of conductive terminals
207*a* first subset of conductive terminals
207*b* second subset of conductive terminals
209 second set of conductive terminals
211 reduced head
211*a* step
300 lossy material
301*a* first protrusion
301*b* second protrusion
301*c* third protrusion
301*d* fourth protrusion
302 platform
400 mount
X1 first central axis
X2 second central axis
X3 third central axis
X4 fourth central axis.

DETAILED DESCRIPTION

The inventors have recognized and appreciated connector design techniques that satisfy electrical and mechanical requirements to support greater bandwidth through high frequency operation. Some of these techniques may synergistically support both higher frequency connector operation and miniaturization. These techniques may be used in any suitable combination to meet signal integrity requirements in connectors designed for 64 Gbps and beyond.

An electrical connector may include a housing, which may include a base portion extending in a longitudinal direction and a tongue portion extending from the base portion in a mating direction perpendicular to the longitudinal direction. The tongue portion may be thinner than the base portion and configured to be inserted into a complementary electrical component, such as an opening of a receptacle connector. The housing may include slots extending through the base portion to surfaces of the tongue portion. The connector may include conductive elements each held in one slot. The conductive elements each may include a contact portion adjacent the surfaces of the tongue portion and configured to make contact with a complementary contact portion of the complementary electrical component. Each conductive element may include a tail portion extending out of the base portion and configured to mount to another electrical component such as a printed circuit board.

The inventors have recognized and appreciated that integrally disposing a lossy material in the base portion of the housing can improve the performance of the connector, while improving the strength of the connector, compared with the conventional approach of assembling inserts into the housing that may make the tongue portion prone to crack. In some embodiments, the housing may be formed with a chamber sized and shaped into which the lossy material is molded, such as in a dual injection molding process. The lossy material may be coupled to at least the portions of ground terminals held in the base portion along their lengths. The lossy material may include portions protruding towards spaces between the portions of signal terminals held in the base portion along their lengths.

In some embodiments, the tongue portion of the housing may include a platform having terminals held thereon. The lossy material may include a corresponding platform such that the lossy material is brought closer to the terminals held on the platform of the tongue portion of the housing. In some embodiments, the tail portions of the terminals may jog toward a plane in which the lossy material extends. Such a configuration may be used in a connector with at least two rows of conductive elements held within the housing such that contact portions of conductive elements in two different rows are exposed on opposing sides of the tongue portion. The tails of the conductive elements in the two rows may jog towards each other such that the tails may be mounted to a surface of a substrate (such as a PCB) that is aligned with a central portion of the connector. Such a configuration may shorten the longest transition sections of the tail portions relative to a connector configured to be mounted to a PCB below the tails of both rows. Such a configuration may enable the conductive elements to have transition sections of a same length and may improve performance of the connector and also enable more compact design with lower profile.

FIGS. 1 to 15 illustrate a plug connector 1 according to a preferred embodiment of the present application. The plug connector 1 may be combined with a mated receptacle connector to constitute an electrical connector assembly. Such electrical connector assembly are capable of providing an industry standard interface such as SFF-8639 to establish an electrical connection between a storage drive (such as a hard disk drive (HDD), a solid state drive (SSD), an optical disk drive (ODD)) and a circuit board (such as a backplane, a midplane, a drive carrier board). The plug connector 1 is configured for mounting to the circuit board and the receptacle connector is configured for connecting the storage drive to the plug connector 1, whereby the plug connector 1 may establish an electrical connection between the circuit board and the receptacle connector, and the receptacle connector may establish an electrical connection between the storage drive and the plug connector 1. In this way, the electrical connection assembly composed of the plug connector 1 and the receptacle connector may establish an electrical connection between the storage drive and the circuit board so as to enable signal and/or power transfer. Such electrical connector assembly may be referred to as "storage drive connector".

As shown in FIGS. 1 to 8, the plug connector 1 includes an insulative housing 100. The insulative housing 100 includes a base portion 101 extending along a longitudinal direction 103, a tongue portion 105 extending from the base portion 101 along a mating direction 107 perpendicular to the longitudinal direction 103 and configured to be plugged into a receptacle connector (not shown) mated with the plug connector 1. The base portion 101 and the tongue portion 105 are integral. The insulative housing 100 may be formed by any suitable manufacturing process in the art such as injection molding. The insulative housing 100 may be partially or entirely formed of an insulative material. Examples of insulative materials that are suitable for forming the insulative housing 100 include, but are not limited to, plastic, nylon, liquid crystal polymer (LCP), polyphenyline sulfide (PPS), high temperature nylon or polyphenylenoxide (PPO) or polypropylene (PP).

With continuing reference to FIGS. 1 to 8, the plug connector 1 further includes a plurality of conductive terminals 200. Each of the plurality of terminals 200 may be formed from a conductive material. The conductive material suitable for forming the terminals 200 may be a metal or metal alloy, such as a copper or copper alloy.

Figure 14B:
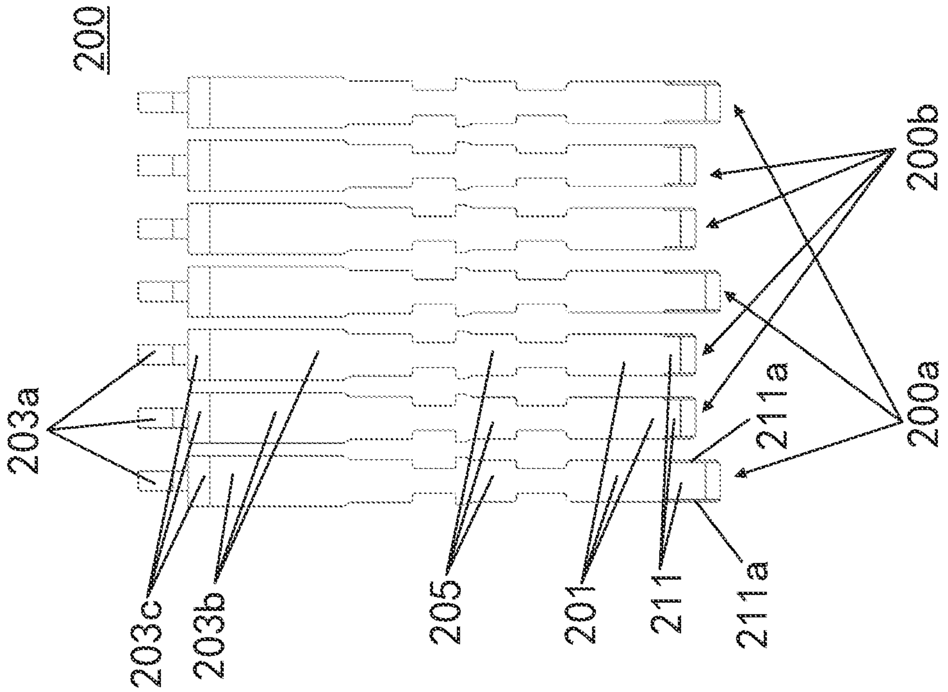
FIG. 14B is a plan view of the portion of the conductive elements of FIG. 14A.
Figure 14A:
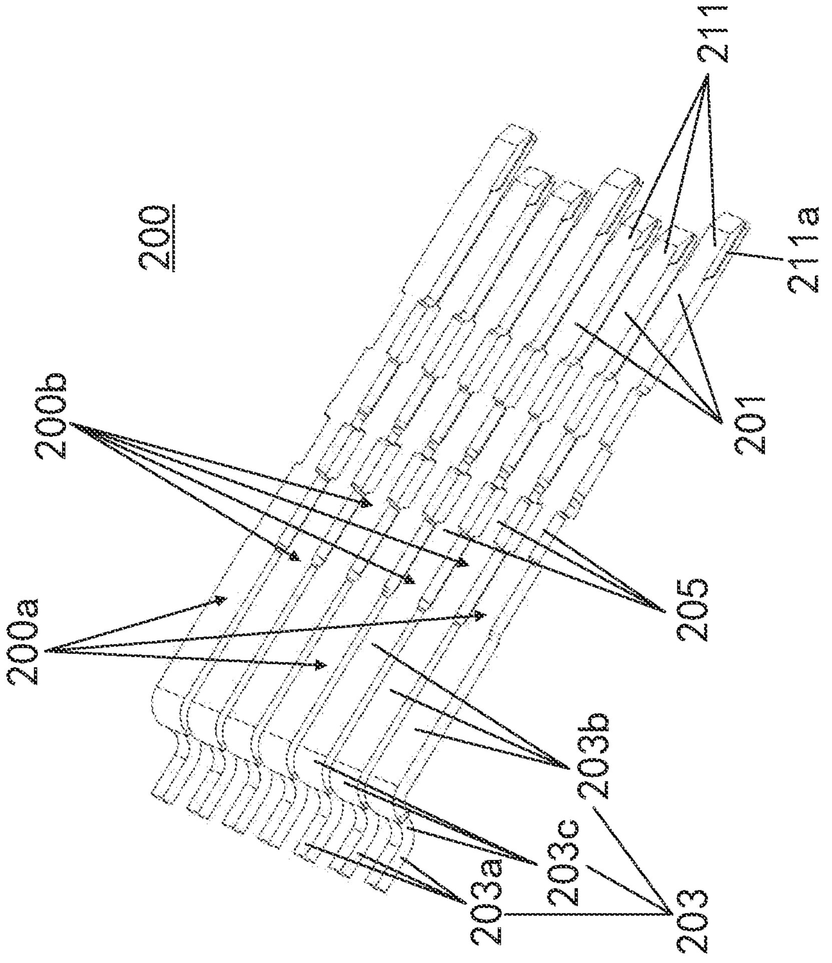
FIG. 14A is a perspective view of a portion of the conductive terminals of the plug connector of FIG. 1.

With further reference to FIGS. 14A and 14B, FIGS. 14A and 14B schematically illustrate a portion of the plurality of conductive terminals 200. Each conductive terminal 200 may include a contact portion 201, a tail portion 203, and an intermediate portion 205 extending between the contact portion 201 and the tail portion 203. The contact portion 201 is configured for establishing an electrical connection with a corresponding conductive terminal of the receptacle connector terminal (not shown), and the tail portion 203 is configured for mounting to a circuit board, and specifically attached to a conductive trace or other conductive structure on the circuit board, by utilizing any suitable technique such as surface mount technology (SMT) and pin immersion solder paste method (PiP). As shown in FIGS. 14A and 14B, the plurality of conductive terminals 200 may include ground terminals ("G") 200*a* and a plurality of pairs of signal terminals ("S") 200*b*. Each pair of signal terminals 200*b* constitutes a differential signal pair for transmitting differential signals. For example, a first signal terminal in each pair of signal terminals 200*b* may be energized by a first voltage, and a second signal terminal may be energized by a second voltage. The voltage difference between the first and second signal terminals represents a signal. The ground terminals 200*a* may be arranged adjacent to each pair of signal terminals 200*b* to separate the plurality of pairs of signal terminals 200*b* from each other to reduce crosstalk between signals, thereby improving signal integrity. These terminals are aligned in a "G-S-S-G-S-S . . . G-S-S-G" pattern, with each pair of signal terminals 200*b* sharing a ground terminal 200*a*. It should be appreciated that FIGS. 14A and 14B illustrate only a portion of the plurality of conductive terminals 200 and that the plurality of conductive terminals 200 may also include other conductive terminals. These other conductive terminals may be the same as or similar to (e.g., having different dimensions from those of) the ground terminal 200*a* and the signal terminal 200*b*, and/or may include power terminals for transmitting power. It is noted that although the ground terminals are identified as 200*a* and the signal terminals are identified as 200*b* among the accompanying drawings, this does not mean that the terminals are limited to having identical dimensions.

Turning back to FIGS. 1 to 8, each of the plurality of conductive terminals 200 is held in the insulative housing 100 with the contact portion 201 extending in the mating direction 107 and being exposed through the outer surface of the tongue portion 105 for establishing an electrical connection with a corresponding conductive terminal of the receptacle connector, and with the tail portion 203 extending out of a side of the base portion 101 opposite to the tongue portion 105 for mounting to the circuit board. The base portion 101 of the insulative housing 100 may be formed with terminal channels or slots to allow a plurality of conductive terminals 200 to be inserted therethrough.

The plug connector 1 further includes a lossy material arranged in the insulative housing 100. As is known in the art, "lossy materials" generally refers to herein materials that are conductive but with some loss, or materials which absorb an electromagnetic energy by another physical mechanism over the frequency range of interest. Lossy materials can be formed from lossy dielectric and/or poorly conductive and/or lossy magnetic materials. Magnetically lossy material can be formed, for example, from materials traditionally regarded as ferromagnetic materials, such as those that have a magnetic loss angle tangent value of being greater than approximately 0.05 in the frequency range of interest. The "magnetic loss angle tangent value" is the ratio of an imaginary part to a real part of the complex electrical permeability of the material. Practical lossy magnetic materials or mixtures containing lossy magnetic materials may also exhibit useful amounts of dielectric loss or conductive loss effects over portions of the frequency range of interest. Lossy material can be formed from material traditionally regarded as non-dielectric materials, such as those that have an electric loss angle tangent value of greater than approximately 0.05 in the frequency range of interest. The "electric loss angle tangent value" is the ratio of the imaginary part to the real part of the complex electrical permittivity of the material. Lossy materials can also be formed from materials that are generally thought of as conductors, but are either relatively poor conductors over the frequency range of interest, contain conductive particles or regions that are not sufficiently dispersed such that they do not provide high conductivity or otherwise are prepared with properties that lead to a relatively weak bulk conductivity compared to a good conductor, such as copper, over the frequency range of interest. Lossy materials typically have a bulk conductivity of about 1 Siemen/meter to about 10,000 Siemens/meter and preferably about 1 Siemen/meter to about 5,000 Siemens/meter. In some embodiments, a material with a bulk conductivity of between about 10 Siemens/meter and about 200 Siemens/meter may be used. As a specific example, a material with a conductivity of about 50 Siemens/meter may be used. However, it should be appreciated that the conductivity of the material may be selected empirically or through an electrical simulation using known simulation tools to determine a suitable conductivity that provides a suitably low crosstalk with a suitably low signal path attenuation or insertion loss. Lossy materials may be partially conductive materials, such as those that have a surface resistivity of between 1 Ω/square and 100,000 Ω/square. In some examples, the electrically lossy material has a surface resistivity of between 10 Ω/square and 1000 Ω/square. As a specific example, the material may have a surface resistivity of between about 20 Ω/square and 80 Ω/square.

The lossy material 300 extends at least in the base portion 101 and is electrically coupled to at least some of the ground terminals 200*a* of the plurality of conductive terminals 200. This configuration eliminates the need to form a recess at the tongue portion 105 as compared to the prior art. This enables to improve the integrity of the plug connector 1 and reduce the likelihood of breakage of the tongue portion 105 from the base portion 101 during plugging and unplugging, thereby improving the reliability and service life of the plug connector 1. In addition, the lossy material can be placed closer to the intermediate portions of the ground terminals 200*a* retained in the base portion 101 as compared to the prior art, thereby improving signal integrity. The insulative housing of the plug connector 1 further includes a chamber 109 formed in the insulative housing 100. In some embodiments, the lossy material may be prefabricated as an insert to be inserted into the chamber 109 and be electrically coupled to at least some of the ground terminals 200*a* of the plurality of conductive terminals 200. In some other embodiments, as shown in FIGS. 10 to 13B, the lossy material 300 may be injection-molded into the chamber 109 and be electrically coupled to at least some of the ground terminals 200*a* of the plurality of conductive terminals 200. That is, the lossy material 300 is a lossy material piece that is injection-molded into the chamber 109 of the insulative housing 100. Many benefits of injection molding the lossy material 300 into the chamber 109 to form the lossy material piece will be described in detail below in connection with FIGS. 10 to 13B. However, it should be appreciated that the present application is not limited thereto, and that the lossy material 300 may also be arranged in the insulative housing 100 through other suitable techniques to provide the benefits described above.

The lossy material 300 may be such a lossy material that can flow into the chamber 109 by the injection molding process and subsequently cure into a desired shape at a desired position in the chamber 109. This lossy material 300 may be a member with a fixed shape, and thus it may also be referred to as "lossy material piece". In some examples, the lossy material may be formed by adding to a binder a filler that contains conductive particles. Conductive particles that may be used as a filler to form a lossy material include, but are not limited to, carbon or graphite formed as fibers, flakes, nanoparticles, or other types of particles. Metal in the form of powder, flakes, fibers or other particles may also be used to provide suitable electrically lossy properties. The binder may be a thermoplastic material including but not limited to liquid crystal polymer (LCP) and nylon. Further, many alternative forms of binder materials may be used. Curable materials, such as epoxies, may serve as a binder. In addition, materials, such as thermosetting resins or adhesives, may be used. In some examples, the melting temperature of the lossy material 300 is lower than that of the material used to form the insulative housing 100 to prevent the insulative housing 100 from melting and deforming during injection molding of the lossy material 300 into the chamber 109.

Electrically coupling the lossy material 300 to at least some of the ground terminals 200*a* of the plurality of conductive terminals 200 allows to reduce the effect of electrical resonance, thereby improving signal integrity. In particular, when the electrical resonance occurs at a frequency within the operating frequency range of the plug connector 1, the integrity of the high-speed signal passing through the plug connector 1 deteriorates. The deterioration in the integrity of the signal passing through the plug connector 1 is partially caused by the loss of signal energy coupled into the resonant signal, which means that less signal energy passes through the plug connector 1. The deterioration in the integrity of the signal passing through the plug connector 1 is also partially caused by the coupling of the resonant signal from the ground terminals 200*a* to the signal terminals 200*b*. The resonant signal accumulates and possesses a high amplitude, so that when the resonant signal is coupled from the ground terminals 200*a* to the signal terminals 200*b*, it will generate a large amount of noise that interferes with the signal. Sometimes, the resonant signal coupled to the signal terminals 200*b* is also referred to as crosstalk. As is known in the art, the frequency at which electrical resonance occurs is related to the length of the ground terminals supporting the electrical resonance, the reason is that the wavelength of the resonant signal is related to the length of the ground terminals supporting the resonance, and the frequency is inversely related to the wavelength. Electrically coupling the lossy material 300 to the ground terminals 200*a* may enable energy coupled into the ground terminals 200*a* and accumulated into a resonant signal to be dissipated in the lossy material 300, which makes the occurrence of electrical resonance less likely, thereby increasing signal integrity and improving the operating frequency range of the plug connector 1.

In addition, as compared to the prior art, injection molding the lossy material 300 into the chamber 109 eliminates the need to form a recess at the tongue portion 105, and the lossy material 300 can completely fill or substantially completely fill the chamber 109. That is, after injection molding the lossy material 300 into the chamber 109, the chamber 109 is completely or substantially completely occupied by the lossy material 300. This allows the integrity of the plug connector 1 to be improved and the likelihood of breakage of the tongue portion 105 from the base portion 101 during plugging and unplugging to be reduced, thereby increasing the reliability and service life of the plug connector 1.

Figure 9:
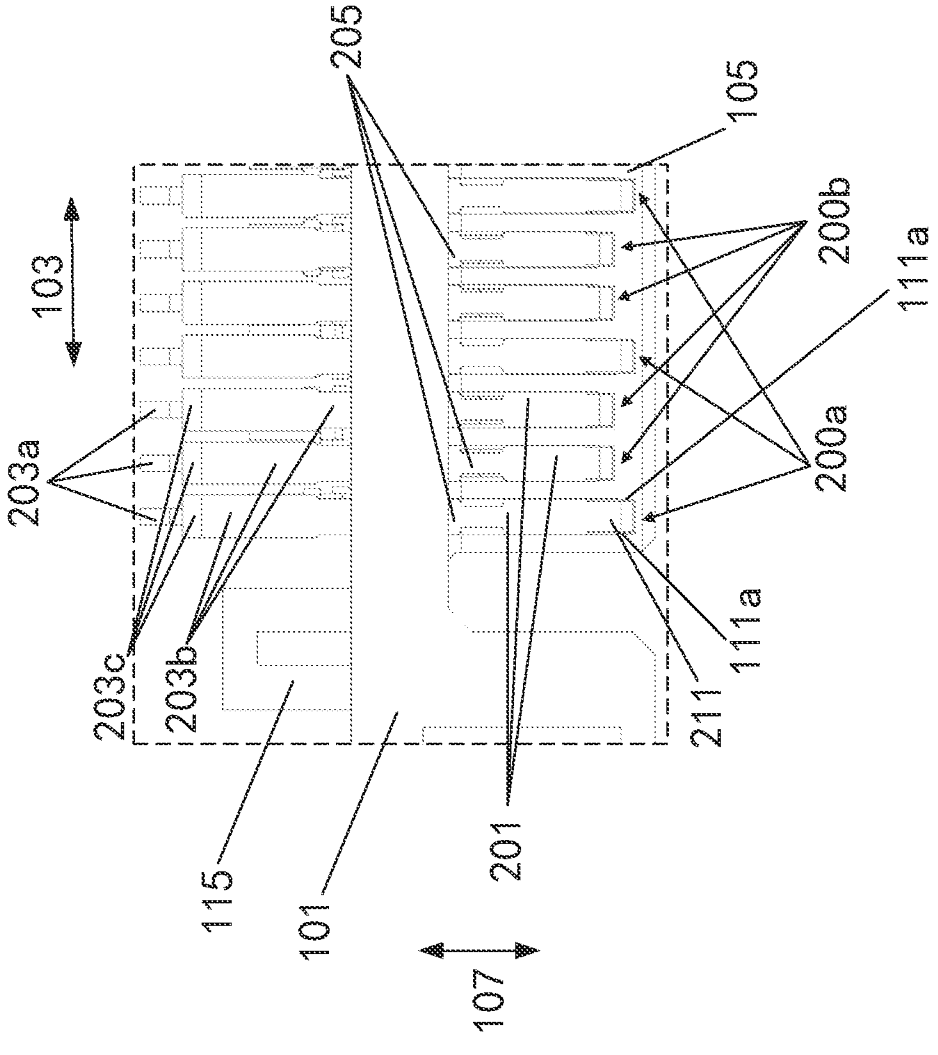
FIG. 9 is an enlarged view of the area circled by dashed lines in FIG. 5.
Figure 10:
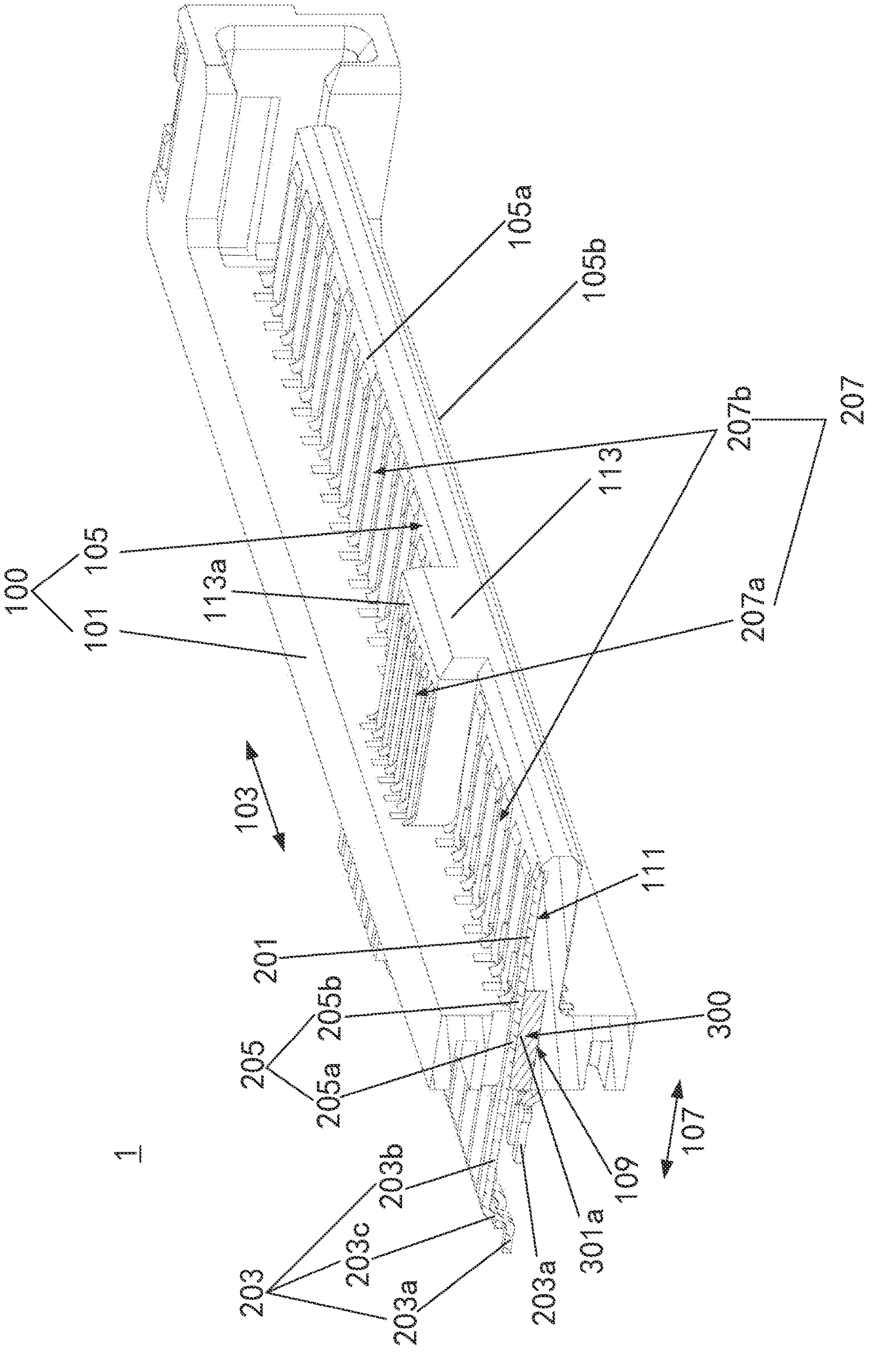
FIG. 10 is a sectional perspective view of the plug connector of FIG. 1 taken along the line A-A in FIG. 5.

As shown in FIGS. 1 to 10, a plurality of conductive terminals 200 are arranged to be a first set of conductive terminals 207 and a second set of conductive terminals 209 spaced apart from each other in the plug connector 1. The lossy material 300 is disposed between the first set of conductive terminals 207 and the second set of conductive terminals 209 and extends therebetween. Each set of the first set of conductive terminals 207 and the second set of conductive terminals 209 includes ground terminals 200*a* and a plurality of pairs of signal terminals 200*b*. Each pair of the plurality of pairs of signal terminals 200*b* constitutes a differential signal pair, and the ground terminals 200*a* separates the plurality of pairs of signal terminals 200*b* from each other. The outer surface of the tongue portion 105 of the insulative housing 100 includes a first outer surface 105*a* and a second outer surface 105*b* opposite to the first outer surface 105*a*. Each of the first outer surface 105*a* and the second outer surface 105*b* is parallel to the longitudinal direction 103 and the mating direction 107. The contact portion 201 of each conductive terminal in the first set of conductive terminals 207 is exposed through the first outer surface 105*a*, and the contact portion 201 of each conductive terminal in the second set of conductive terminals 209 is exposed through the second outer surface 105*b*. The intermediate portion 205 of each conductive terminal in the first set of conductive terminals 207 and the second set of conductive terminals 209 is retained at least partially in the base portion 101 of the insulative housing 100. In some examples, as shown in FIG. 10, a first section 205*a* of the intermediate portion 205 of the ground terminal 200*a* is retained in the base portion 101 and a second section 205*b* extends out from the base portion 101 to the tongue portion 105. However, it should be appreciated that in some examples, the intermediate portion 205 of each conductive terminal in the first set of conductive terminals 207 and the second set of conductive terminals 209 may be retained in the base portion 101 of the insulative housing 100 in its entirety. It should also be appreciated that the first section 205*a* of the intermediate portion 205 may include barb features to help resist plugging and unplugging forces, thereby retaining the conductive terminals firmly in the base portion 101. It should also be appreciated that the plug connector 1 may include only one set of the first set of conductive terminals 207 and the second set of conductive terminals 209.

Figure 11:
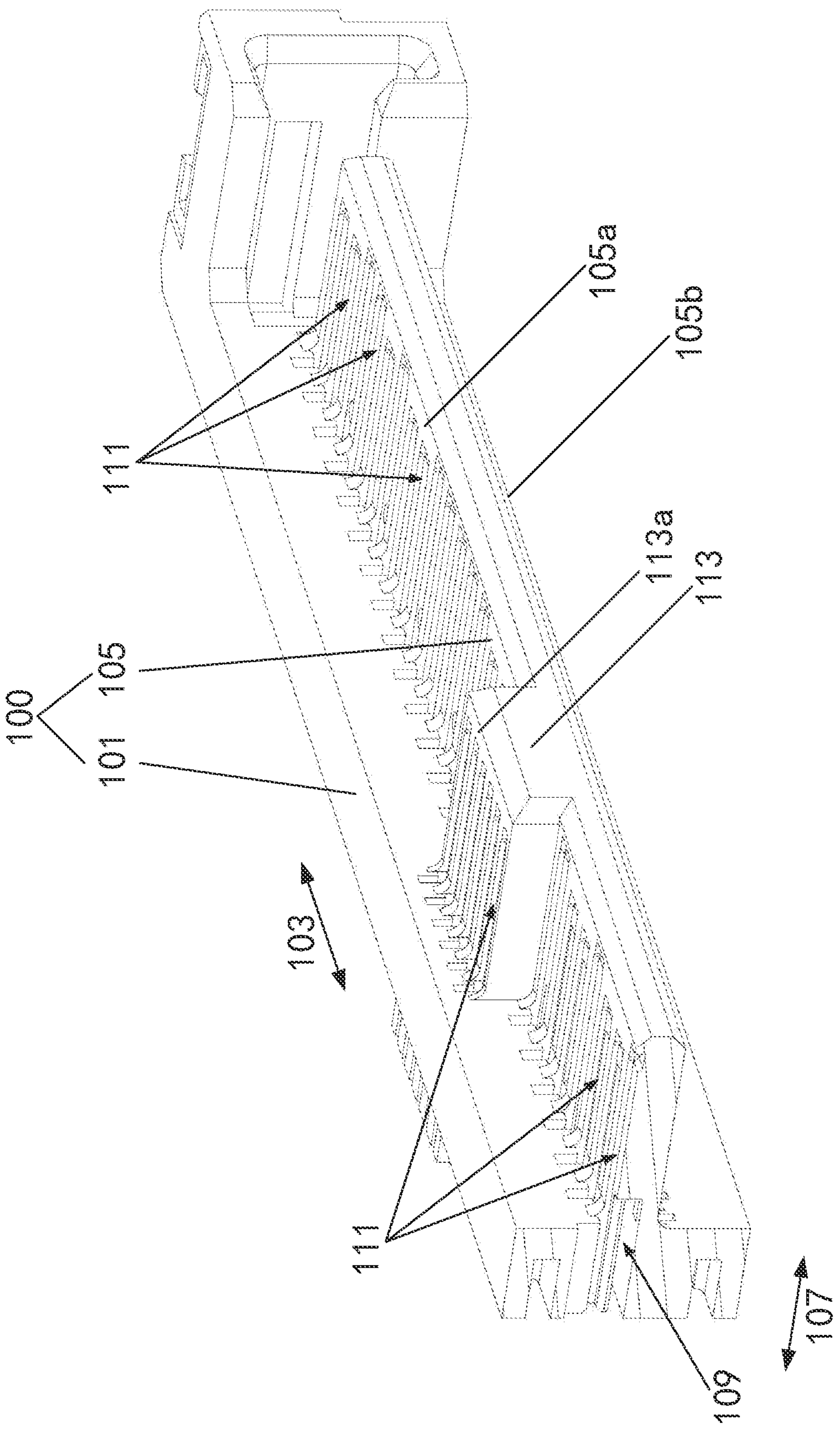
FIG. 11 is a sectional perspective view of the plug connector of FIG. 1 taken along the line A-A in FIG. 5, with the conductive terminals and the lossy material of the plug connector hidden to show the chamber in the insulative housing.

As shown in FIG. 11, the tongue portion 105 includes a plurality of terminal slots 111 recessed from the outer surfaces (i.e., the first outer surface 105*a* and the second outer surface 105*b*). At least the contact portion 201 of each of the plurality of conductive terminals 200 is received in a corresponding one of the plurality of terminal slots 111. In some examples, as shown in FIG. 10, the contact portion 201 and the second section 205*b* of the intermediate portion 205 of each of the plurality of conductive terminals 200 are received in a corresponding one of the plurality of terminal slots 111.

In order to electrically couple the lossy material 300 to at least some of the plurality of conductive terminals 200, the lossy material 300 includes a plurality of protrusions extending towards these ground terminals 200*a*. The lossy material 300 is electrically coupled to a corresponding one of these ground terminals 200*a* through each of these protrusions. In some examples, each of the plurality of protrusions is electrically coupled to the intermediate portion 205 of a corresponding one of these ground terminals 200*a*. The position where the ground terminals 200*a* are coupled together defines an end of the structure that supports electrical resonance. For example, if the protrusion of the lossy material 300 is electrically coupled to the ground terminal 200*a* in the middle of the ground terminal 200*a*, the ground terminal 200*a* is not one long structure supporting electrical resonance, but two structures supporting electrical resonance, each of the two structures has a length which is half the length of the ground terminal 200*a*. The wavelength of the electric resonance also becomes half, but the frequency of the electric resonance will be doubled. In other words, with the lossy material 300, the electrical resonance that interferes with the operation of the plug connector 1 occurs at twice the frequency, i.e., the plug connector 1 is able to operate in twice the frequency range, compared to the case without the lossy material 300. It should be appreciated that, as an alternative, the lossy material 300 may include a plurality of protrusions extending towards all the ground terminals 200*a* of the plurality of conductive terminals 200.

In some embodiments, each of the plurality of protrusions is in direct contact with the intermediate portion 205 of a corresponding one of these ground terminals 200*a* to enable electrical coupling. In particular, as shown in FIG. 10 and as described above, a first section 205*a* of the intermediate portion 205 of the ground terminal 200*a* is retained in the base portion 101 and a second section 205*b* extends out from the base portion 101 to the tongue portion 105. The first section 205*a* is retained in the base portion 101 and is exposed in the chamber 109. A corresponding protrusion (marked with 301*a* in FIG. 10) is in direct contact with at least the exposed first section 205*a* of the intermediate portion 205 to enable electrical coupling. The second section 205*b* and the contact portion 201 are received in the terminal slot 111. The chamber 109 extends from the base portion 101 to the tongue portion 105 such that the lossy material 300 extends from the base portion 101 into the tongue portion 105, and a portion of the corresponding protrusion is exposed at the bottom of the terminal slot 111 and is in direct contact with the second section 205*b*.

In some other embodiments, each of the plurality of protrusions is disposed sufficiently close to the intermediate portion 205 of a corresponding one of these ground terminals 200*a* to capacitively couple with the intermediate portion 205. In this example, there is a gap between the protrusion and the corresponding intermediate portion 205. In an alternative example, the gap may be filled by the insulative housing 100 such that the protrusion and the corresponding intermediate portion 205 are spaced apart by the insulative housing 100. In an alternative example, the chamber 109 extends from the base portion 101 to the tongue portion 105 such that the lossy material 300 can be injection-molded into the tongue portion 105.

Figure 12:
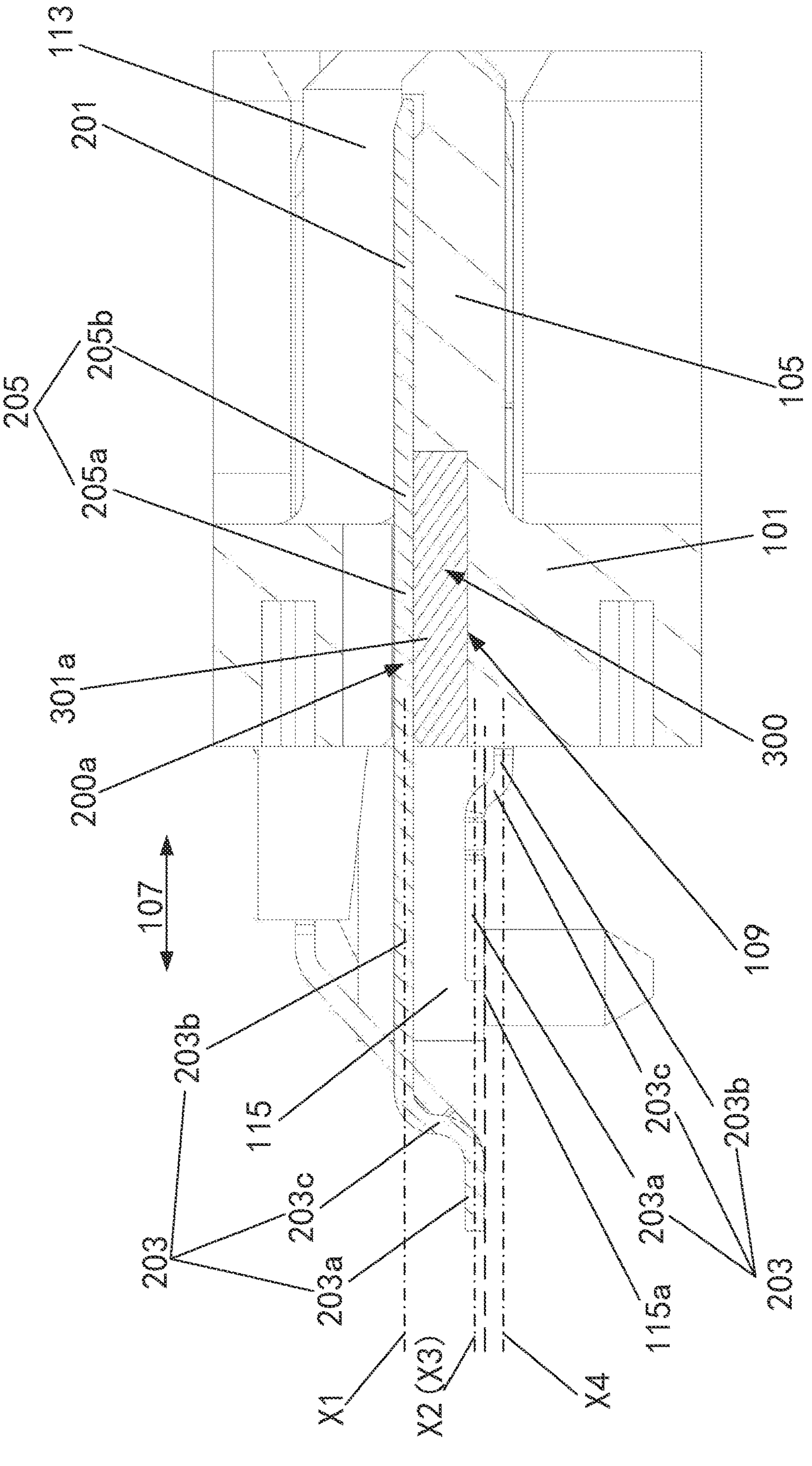
FIG. 12 is a cross-sectional view of the plug connector in FIG. 1 taken along line A-A in FIG. 5.
Figure 15:
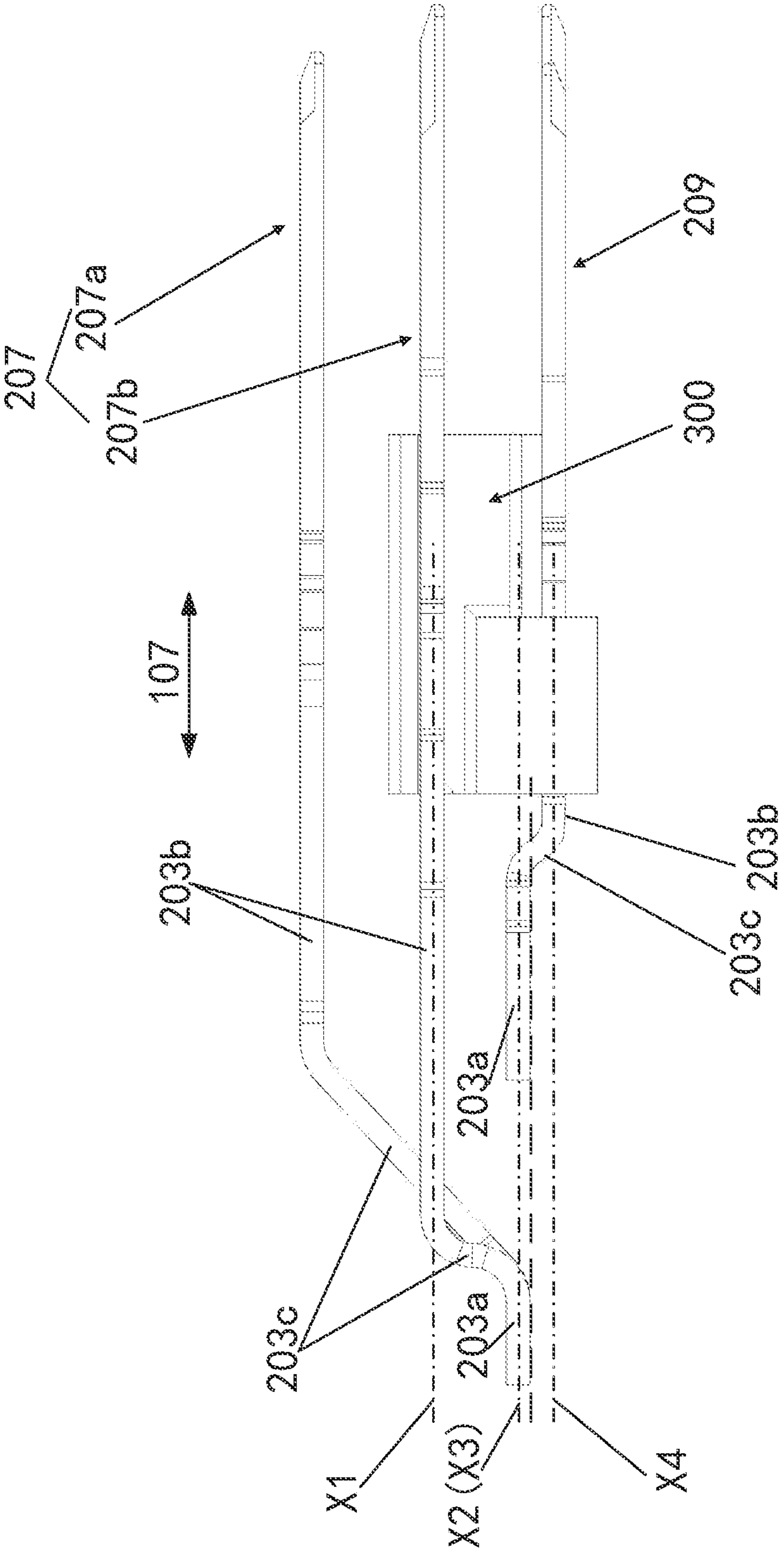
FIG. 15 is a left side view of the plug connector of FIG. 1, with the insulative housing of the plug connector hidden to show the conductive terminals and the lossy material in the plug connector.

In some embodiments, as shown in FIGS. 12 and 15, the lossy material 300 extends to a first side of the base portion 101 from which the tail portion 203 of the conductive terminal 200 protrudes. As compared to the prior art, this allows the tail portion 203 of the conductive terminal 200 to be arranged closer to the lossy material 300, thereby improving signal integrity.

Figure 13A:
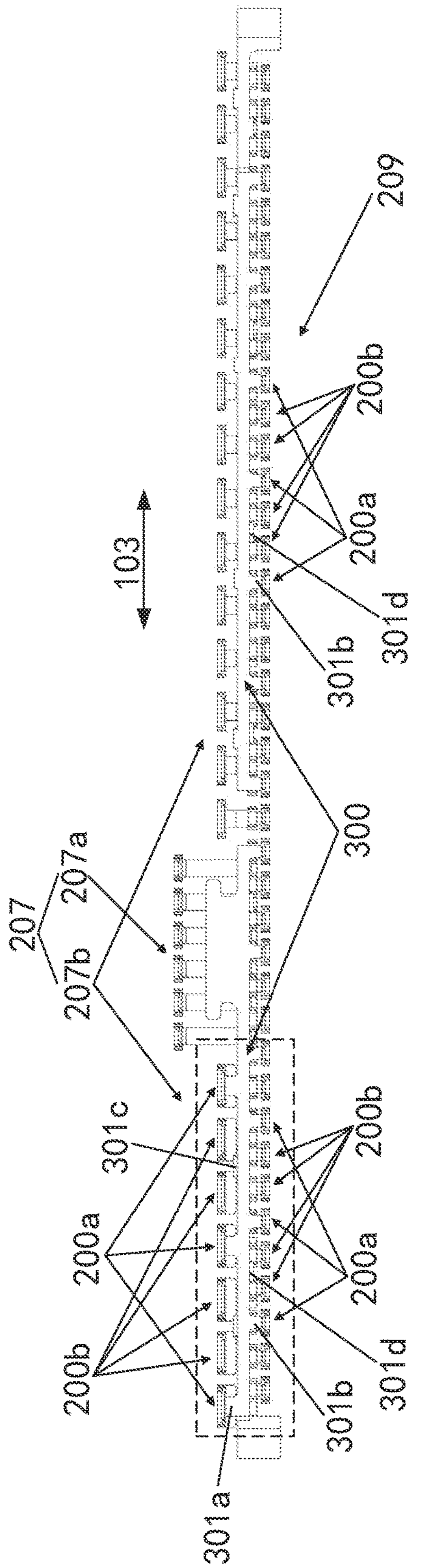
FIG. 13A is a front view similar to that of FIG. 6, except that the insulative housing of the plug connector is removed to show the conductive terminals and the lossy material in the plug connector.
Figure 13B:
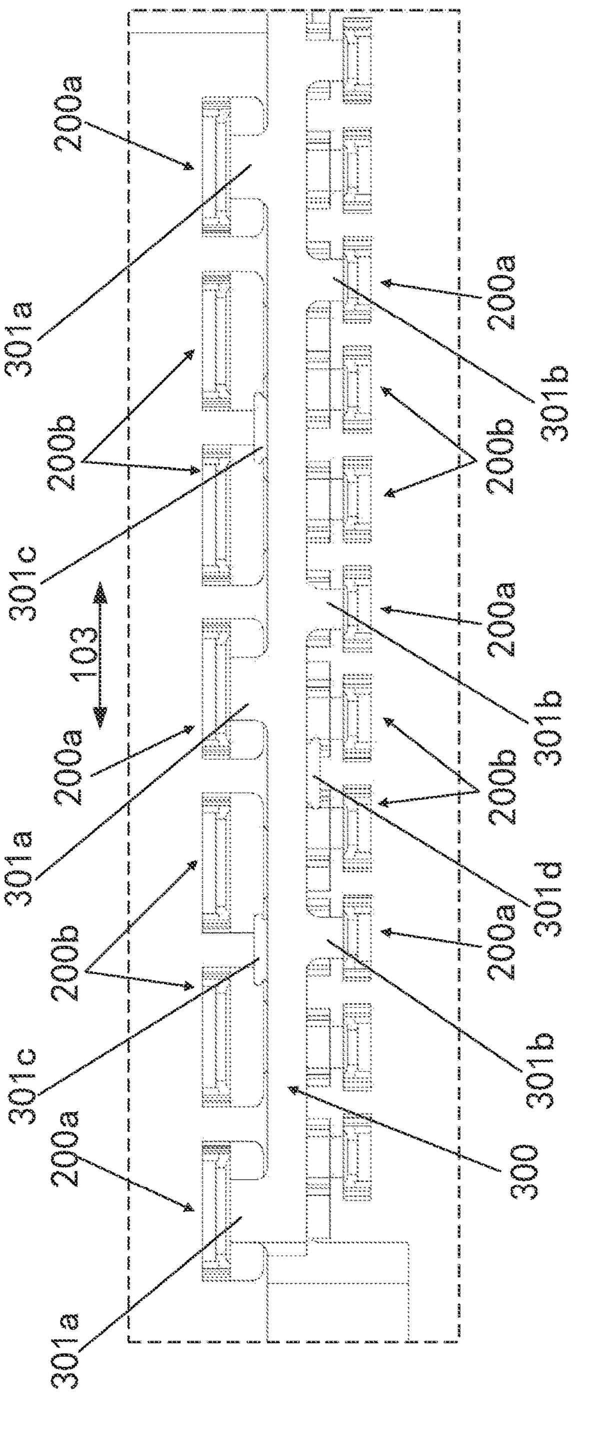
FIG. 13B is an enlarged view of the area circled by dashed lines in FIG. 13A.

In some embodiments, the lossy material 300 includes multiple pieces of lossy material, and each of the multiple pieces of lossy material couples a corresponding portion of the ground terminals 200*a* of the plurality of conductive terminals 200 together. As shown in FIGS. 4, 10, 12, 13A and 13B, the lossy material 300 includes two pieces of lossy material, and each of the two pieces of lossy material couples a corresponding portion of the ground terminals 200*a* in the first set of conductive terminals 207 and the second set of conductive terminals 209 together. In some examples, the lossy material 300 electrically couples at least some of the ground terminals 200*a* in the first set of conductive terminals 207 with at least some of the ground terminals 200*a* in the second set of conductive terminals 209. In some examples, as shown in FIGS. 13A and 13B, the lossy material 300 includes a plurality of first protrusions 301*a* extending towards the ground terminal 200*a* in the first set of conductive terminals 207 and a plurality of second protrusions 301*b* extending towards the ground terminal 200*a* in the second set of conductive terminals 209. Each of the plurality of first protrusions 301*a* is electrically coupled to the intermediate portion 205 of a corresponding one of the ground terminals 200*a* in the first set of conductive terminals 207, and each of the plurality of second protrusions 301*b* is electrically coupled to the intermediate portion 205 of a corresponding one of the ground terminals 200*a* in the second set of conductive terminals 209. As noted above, such electrical coupling may be direct contact or capacitive coupling. In some examples, as shown in FIGS. 13A and 13B, the plurality of first protrusions 301*a* may be offset from the plurality of second protrusions 301*b* in the longitudinal direction 103. In other words, the plurality of first protrusions 301*a* are not aligned with the plurality of second protrusions 301*b* in the longitudinal direction 103. Through providing that the plurality of first protrusions 301*a* are offset from the plurality of second protrusions 301*b* in the longitudinal direction 103, it is possible to allow for an offset between the conductive terminals 200 in the first set of conductive terminals 207 and the second set of conductive terminals 209, so as to further reduce interference between the conductive terminals 200, thereby further improving signal integrity. It should be appreciated that in some other examples, the lossy material 300 is a single piece of lossy material and couples all the ground terminals 200*a* of the plurality of conductive terminals 200 together.

Figure 4:
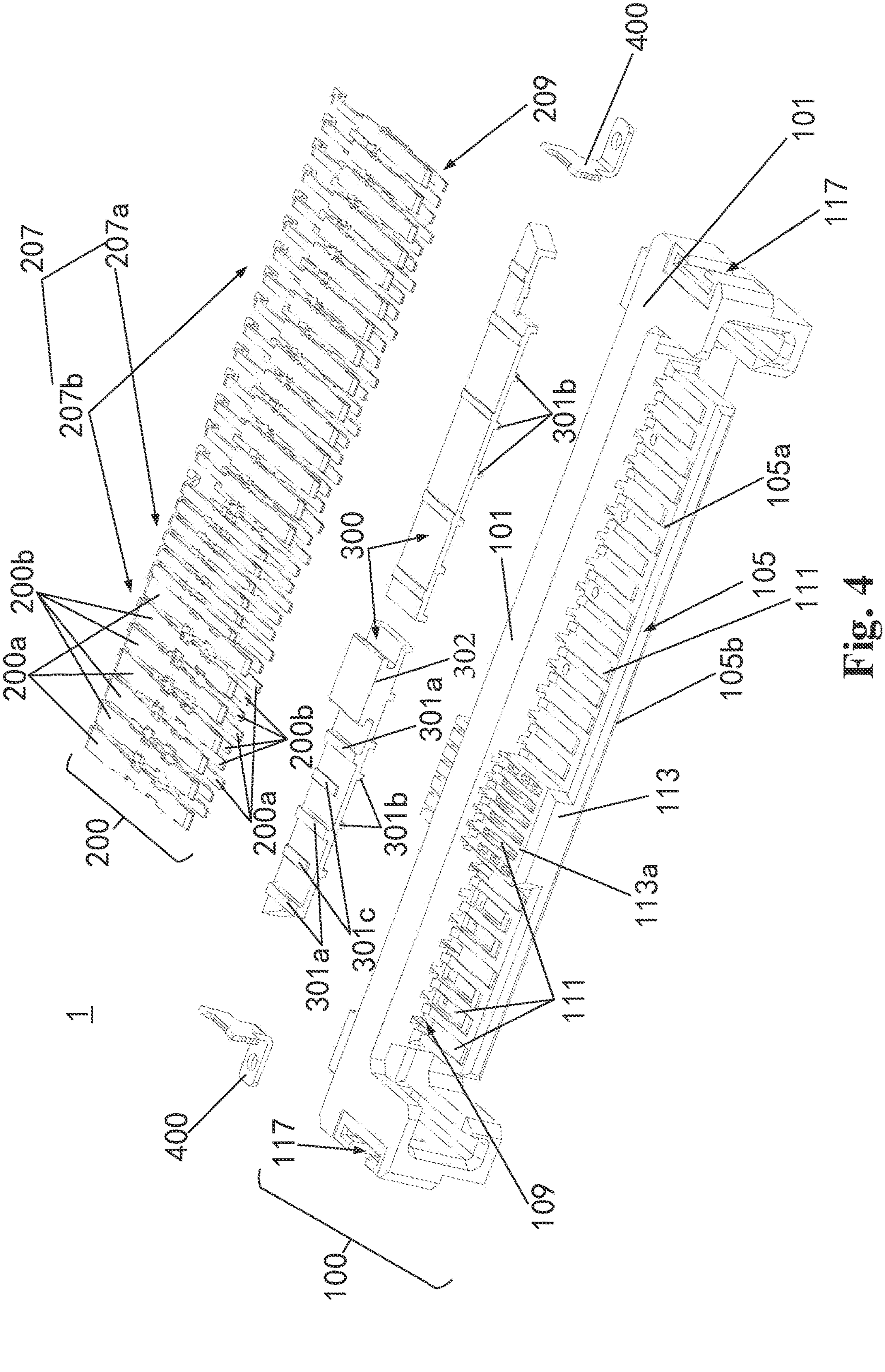
FIG. 4 is an exploded view of the plug connector of FIG. 1.
Figure 5:
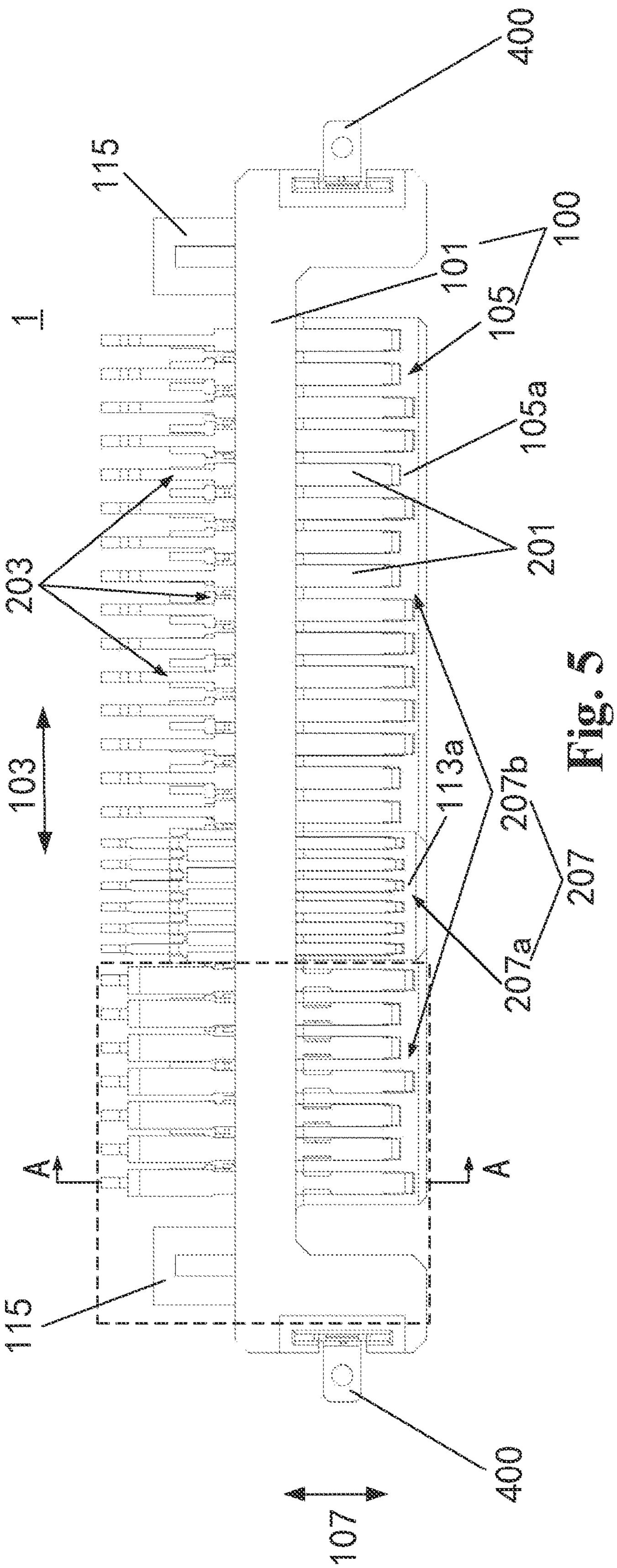
FIG. 5 is a top view of the plug connector of FIG. 1.
Figure 6:
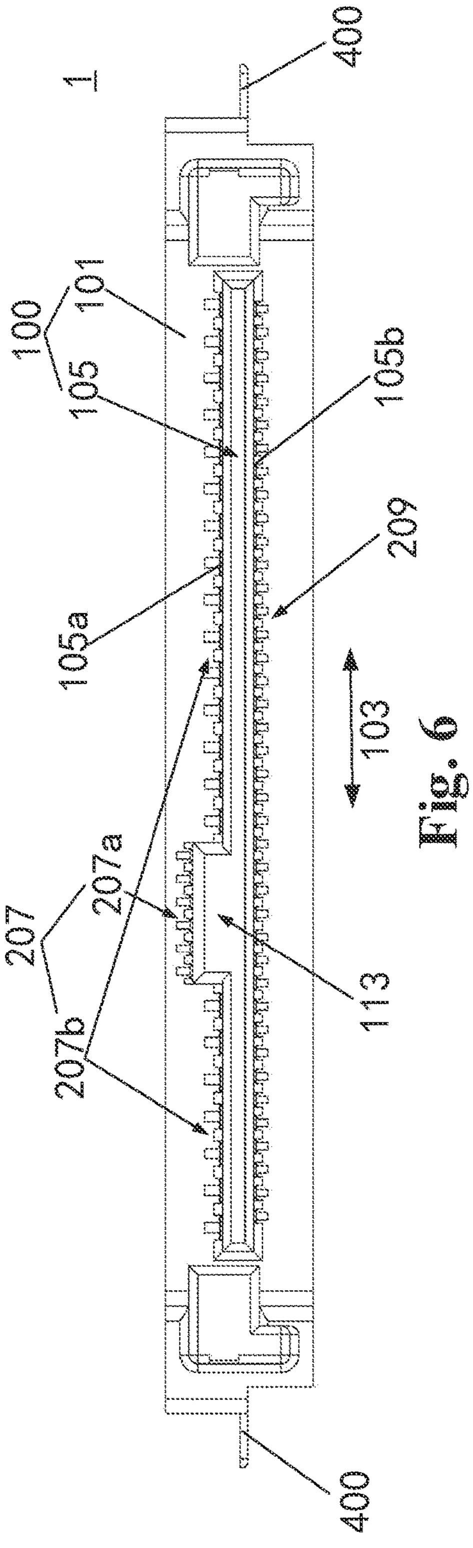
FIG. 6 is a front view of the plug connector of FIG. 1.
Figure 7:
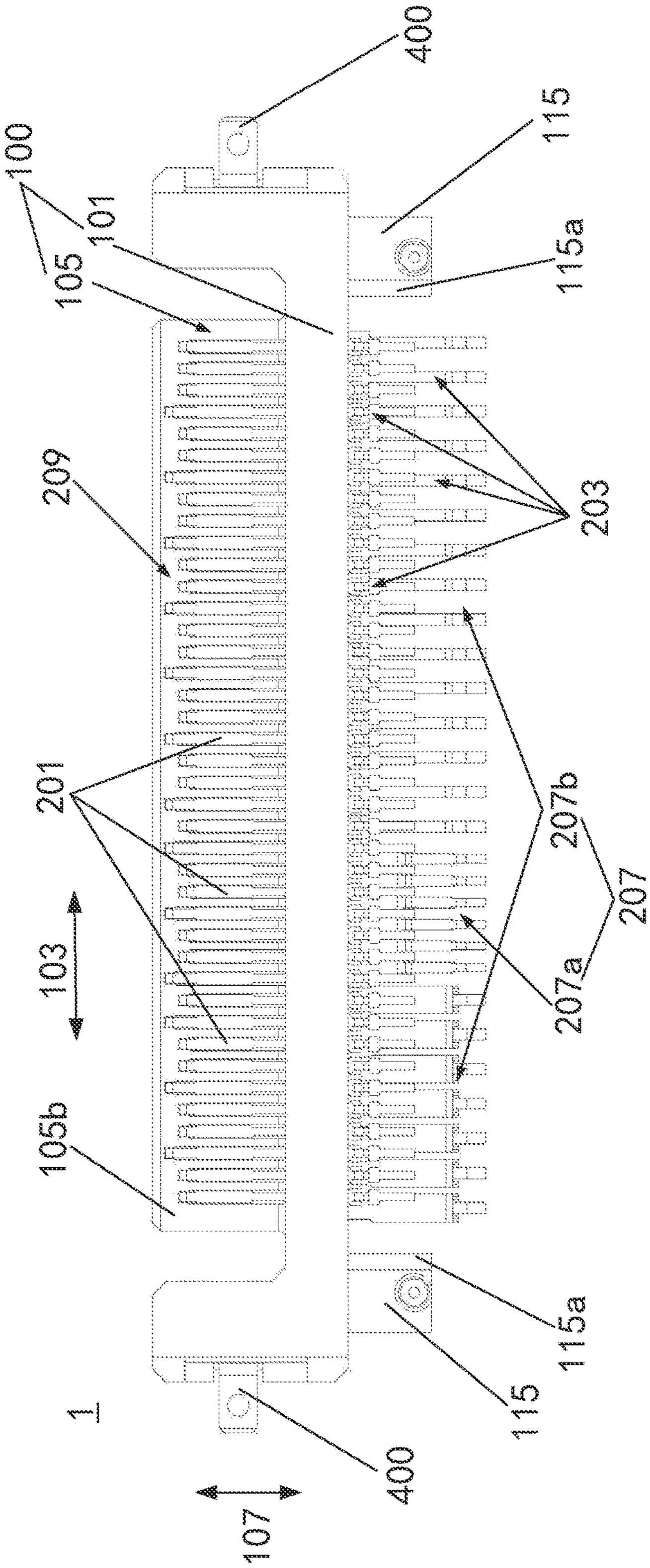
FIG. 7 is a bottom view of the plug connector of FIG. 1.
Figure 8:
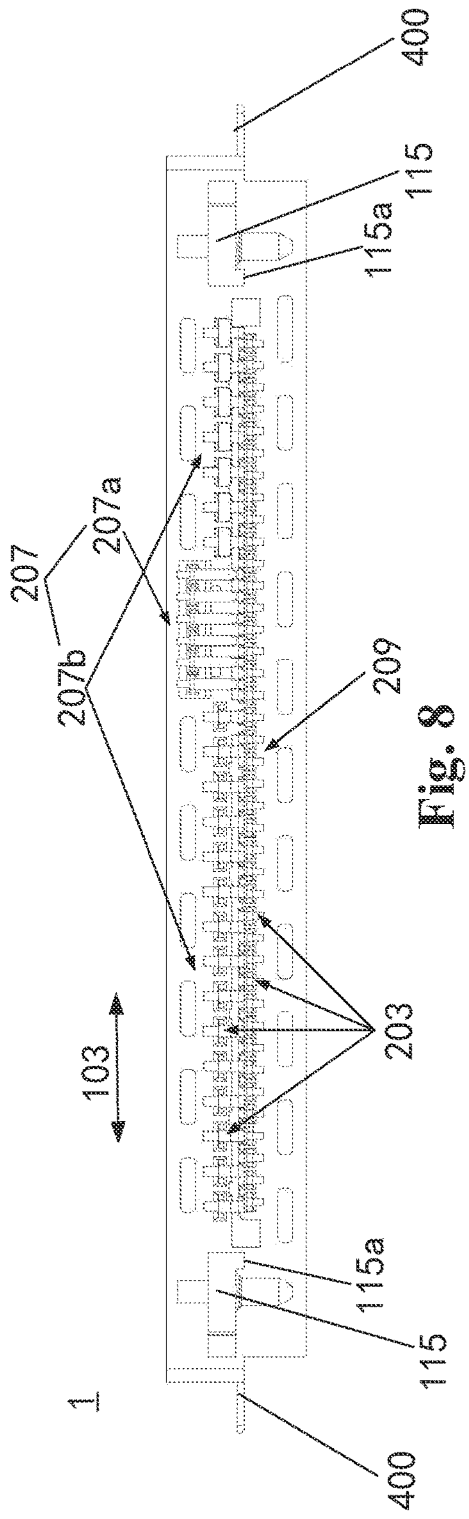
FIG. 8 is a rear view of the plug connector of FIG. 1.

In some embodiments, as shown in FIGS. 4, 13A, and 13B, the lossy material 300 further includes a plurality of third protrusions 301*c* and a plurality of fourth protrusions 301*d*. Each of the plurality of third protrusions 301*c* extends towards a space between the intermediate portions 205 of each pair of the plurality of pairs of signal terminals 200*b* in the first set of conductive terminals 207. Each of the plurality of fourth protrusions 301*d* extends towards a space between the intermediate portions 205 of each pair of the plurality of pairs of signal terminals 200*b* in the second set of conductive terminals 209. Each of the plurality of third protrusions 301*c* does not extend to a position between the intermediate portions 205 of each pair of the plurality of pairs of signal terminals 200*b* in the first set of conductive terminals 207, and each of the plurality of fourth protrusions 301*d* does not extend to a position between the intermediate portions 205 of each pair of the plurality of pairs of signal terminals 200*b* in the second set of conductive terminals

209. Each of the plurality of third protrusions 301*c* and the plurality of fourth protrusions 301*d* forms an interlocking mechanism with the insulative housing 100. In this way, the binding force between the lossy material 300 and the insulative housing 100 can be increased to prevent them from cracking and separating during the injection molding process and subsequent use. In some examples, as shown in FIGS. 13A and 13B, each of the plurality of third protrusions 301*c* and the plurality of fourth protrusions 301*d* is elongated along the mating direction 107 and has a dovetail-shaped cross-section. It should be appreciated that in some other examples, the plurality of third protrusions 301*c* and the plurality of fourth protrusions 301*d* may also be in any other suitable forms so as to form an interlocking mechanism with the insulative housing 100.

In some embodiments, as shown in FIGS. 1 to 6, 10 and 11, the tongue portion 105 further includes a first platform 113 protruding from a first outer surface 105*a* of the tongue portion 105. The first platform 113 defines a first platform surface 113*a* parallel to the first outer surface 105*a*. It should be appreciated that the first platform surface 113*a* may also be considered as part of the first outer surface 105*a*. The first set of conductive terminals 207 includes a first subset of conductive terminals 207*a* and a second subset of conductive terminals 207*b*. The contact portion 201 of each conductive terminal 200 in the first subset of conductive terminals 207*a* of the first set of conductive terminals 207 is exposed through the first platform surface 113*a*. The conductive terminals 200 in the first subset of conductive terminals 207*a* and the conductive terminals 200 in the second subset of conductive terminals 207*b* are aligned along the longitudinal direction 103, respectively. Each of the conductive terminals 200 in the second set of conductive terminals 209 are aligned along the longitudinal direction 103. The first platform 113 may provide a dummy-proof design to prevent the plug connector 1 from being intentionally or unintentionally inserted into the receptacle connector in a wrong orientation. In some embodiments, the lossy material 300 may include a corresponding platform 302, which may bring the lossy material closer to the conductive terminal 207*a* held on the platform 113. In some examples, as shown in FIG. 13A, the lossy material 300 is only electrically coupled to the ground terminal 200*a* in the second subset of conductive terminals 207*b*. For example, the second subset of conductive terminals 207*b* may be divided into at least two parts by the first platform. The lossy material 300 includes multiple pieces of lossy material (two pieces in FIG. 13A), and each piece of the multiple pieces of lossy material 300 is electrically coupled to the ground terminals 200*a* in a corresponding one of the at least two parts.

In some embodiments, as shown in FIGS. 9, 14A, and 14B, each of the plurality of conductive terminals 200 further includes a reduced head 211 extending from the contact portion 201 opposite to the intermediate portion 205 along the mating direction 107. The reduced head 211 is received in the terminal slot 111. The reduced head 211 is provided with steps 211*a* on both sides along the mating direction 107, and both side walls of each of the plurality of terminal slots 111 are provided with protrusions 111*a* configured to abut against the steps 211*a* of the reduced head 211 of a corresponding conductive terminal 200 to prevent the corresponding conductive terminal from buckling.

In some embodiments, as shown in FIGS. 1 to 3, 5 and 7, the contact portions 201 of the ground terminals 200*a* of the plurality of conductive terminals 200 have a longer length than those of the signal terminals 200*b* so that when the plug connector 1 is mated with the receptacle connector, the ground terminals 200*a* will contact with the conductive terminals of the receptacle connector prior to the signal terminal 200*b*.

In some embodiments, as shown in FIGS. 12 and 15, the tail portion 203 of each conductive terminal 200 in the first set of conductive terminals 207 and the tail portion 203 of each conductive terminal 200 in the second set of conductive terminals 209 are configured to deflect towards a plane (not shown) between the first set of conductive terminals 207 and the second set of conductive terminals 209, respectively, such that end sections 203*a* of the tail portion 203 of each conductive terminal 200 in the first set of conductive terminals 207 and the tail portion 203 of each conductive terminal 200 in the second set of conductive terminals 209 are configured for mounting to the circuit board are in the same plane (as indicated by the dashed lines in FIGS. 12 and 15). In this way, it is possible to reduce a mounting profile (height) of the plug connector 1 on the circuit board. When the plug electrical connector 1 is mounted in the electronic system (not shown), the plug electrical connector 1 takes up less space so that the space in the electronic system can be better utilized, thus enabling the entire assembly including the plug connector 1 and the electronic system to be more miniaturized. It should be appreciated that the plane towards which the tail portion 203 of each conductive terminal 200 in the first set of conductive terminals 207 and the tail portion 203 of each conductive terminal 200 in the second set of conductive terminals 209 deflect is not necessarily a middle plane between the first set of conductive terminals 207 and the second set of conductive terminals 209.

As shown in FIGS. 12 and 15, the end sections 203*a* of the tail portions 203 of the second set of conductive terminals 209 are closer to the lossy material 300 than the end sections 203*a* of the tail portions 203 of the first set of conductive terminals 207. However, it should be appreciated that the present application is not limited thereto, and it can be contemplated that the end sections 203*a* of the tail portions 203 of the first set of conductive terminals 207 are closer to the lossy material 300 than the end sections 203 of the tail portions 203 of the second set of conductive terminals 209.

As shown in FIGS. 12, 14A, 14B and 15, the tail section 203 of each of the plurality of conductive terminals 200 further includes a straight section 203*b* extending parallelly from the intermediate portion 205, and a transition section 203*c* transitioning from the straight section 203*b* to the end section 203*a*. The end section 203*a* is parallel to the straight section 203*b* and offset from the straight section 203*b*. As shown in FIGS. 12 and 15, the straight section 203*b* and the end section 203*a* of the tail section 203 of each conductive terminal 200 in the first set of conductive terminals 207 define a first central axis X1 and a second central axis X2, respectively. The straight section 203*b* and the end section 203*a* of the tail section 203 of each conductive terminal 200 in the second set of conductive terminals 209 define a third central axis X3 and a fourth central axis X4, respectively. The second central axis X2 and the fourth central axis X4 are coplanar in a plane parallel to the longitudinal direction 103 and the mating direction 107. A central separation between the first central axis X1 and the third central axis X3 is greater than a distance between the first central axis X1 and the second central axis X2 and greater than a distance between the third central axis X3 and the fourth central axis X4. As used herein, the central separation between the two central axes refers to the distance between projections of the two central axes in a plane perpendicular to the longitudinal direction 103. Further, as used herein, the distance between one central axis line and the other central axis line refers to the distance between them in a plumb line. In some examples, for example in the case without the first platform 113 described above, the central separation between the first central axis X1 and the third central axis X3 may be equal to the distance between the first central axis X1 and the second central axis X2 plus the distance between the third central axis X3 and the fourth central axis X4.

In some embodiments, as shown in FIGS. 1, 2, 3, 5, 7 and 8, the insulative housing 100 further includes at least one mounting platform 115 (two in the figures) extending from the base portion 101 opposite to the tongue portion 105 in the mating direction 107. Each of the at least one mounting platform 115 has a mounting surface 115*a* configured for mounting to a circuit board (not shown), and is co-planar with surfaces of the end section 203*a* of the tail portion 203 of each conductive terminal 200 in the first set of conductive terminals 207 and the end portion 203*a* of the tail portion 203 of each conductive terminal 200 in the second set of conductive terminals 209 facing a mounting direction (not shown), wherein the mounting direction is perpendicular to the mating direction 107 and the longitudinal direction 103 as mentioned above. In some examples, the mounting platform 115 may also include a structure for guiding and positioning the plug connector 1 when the plug connector 1 is mounted to the circuit board.

In some embodiments, as shown in FIGS. 1 to 9, the insulative housing 100 also includes mount receiving portions 117 at both ends of the base portion 101 along the longitudinal direction 103 for receiving the mounts 400. The mounts 400 may be used to retain the plug connector 1 securely on the circuit board. The mounts 400 are illustrated in the figures to be in the form of a tab, however, it should be appreciated that the present application is not limited thereto.

A method for manufacturing the aforementioned plug connector 1 is described below in connection with FIG. 16.

Figure 16:
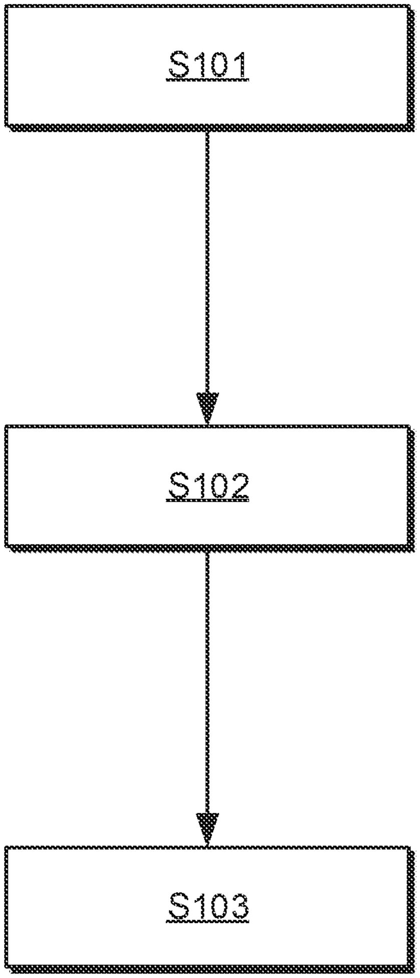
FIG. 16 is a flow chart, illustrating the steps for manufacturing the plug connector of FIG. 1, according to some embodiments.

As shown in FIG. 16, at step S101, the insulative housing 100 of the plug connector 1 is formed, wherein the insulative housing 100 comprises the base portion 101 extending along the longitudinal direction 103, the tongue portion 105 extending from the base portion 101 in the mating direction 107 perpendicular to the longitudinal direction 103 and configured to be plugged into the receptacle connector, and the chamber 109 formed in the insulative housing 100. As described above, the insulative housing 100 may be formed by any suitable manufacturing process in the art, such as an injection molding.

Next, at step S102, the lossy material 300 is injection-molded into the chamber 109. This step may also be referred to as a secondary injection molding.

Finally, at step S103, the plurality of conductive terminals 200 are inserted into and retained in the insulative housing 100, with the contact portion 201 of each of the plurality of conductive terminals 200 extending along the mating direction 107 and being exposed through the outer surface of the tongue portion 105 for establishing an electrical connection with a corresponding conductive terminal of the receptacle connector, and with the tail portion 203 extending out of the base portion 101 from a side of the base portion 101 opposite to the tongue portion 105 for mounting to the circuit board. The step of inserting and retaining the plurality of conductive terminals 200 in the insulative housing 100 includes electrically coupling at least some of the ground terminals 200*a* of the plurality of conductive terminals 200 with the lossy material 300. This allows to reduce the effects of electrical resonance, thereby improving signal integrity. In addition, as compared to the prior art, injection molding the lossy material 300 into the chamber 109 eliminates the need to form a recess at the tongue portion 105, and the lossy material 300 is able to completely fill or substantially completely fill the chamber 109. This allows for improved integrity of the plug connector 1 and reduces the likelihood of breakage of the tongue portion 105 from the base portion 101 during plugging and unplugging, thereby improving the reliability and service life of the plug connector 1.

It should be appreciated that each of the steps shown in FIG. 16 may further include providing the features or combination of features described above in connection with FIGS. 1 to 15, i.e., providing each of the features of the plug connector 1 described above in connection with FIGS. 1 to 15.

Although details of specific configurations of conductive elements and housings are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Furthermore, although many inventive aspects are shown and described with reference to a plug connector having a right angle configuration, it should be appreciated that aspects of the present disclosure is not limited in this regard, as any of the inventive concepts, whether alone or in combination with one or more other inventive concepts, may be used in other types of electrical connectors, such as receptacle connectors, card edge connectors, backplane connectors, stacking connectors, mezzanine connectors, I/O connectors, chip sockets, etc.

In some embodiments, mounting ends were illustrated as surface mount elements that are designed to fit within pads of printed circuit boards. However, other configurations may also be used, such as press fit "eye of the needle" compliant sections, spring contacts, solderable pins, etc.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. An electrical connector comprising:

a housing comprising a base portion extending in a longitudinal direction, a tongue portion extending from the base portion in a mating direction perpendicular to the longitudinal direction, and a plurality of slots extending through the base portion to surfaces of the tongue portion;

a plurality of conductive elements each held by one slot of the plurality of slots of the housing, the plurality of conductive elements comprising signal conductors and ground conductors; and a lossy material integral with the housing at a joint between the base portion and the tongue portion such that both the mechanical strength and the electrical performance of the connector are enhanced, wherein:

each conductive element comprises a first section held in the base portion and a second section held by the tongue portion, and the lossy material is coupled to both the first sections and second sections of the ground conductors.

2. The electrical connector of claim 1, wherein the lossy material is molded to the housing to span the joint between the base portion and the tongue portion.

3. The connector of claim 1, wherein:

the plurality of conductive elements each comprises a first portion extending in the mating direction and disposed on the surfaces of the tongue portion, a second portion opposite the first portion and extending out of the base portion, and a third portion extending between the first portion and the second portion, and the lossy material is coupled to at least part of the first portions of the ground conductors.

4. The connector of claim 1, wherein:

the plurality of conductive elements each comprises a contact portion extending in the mating direction and held by the tongue portion, a tail portion opposite the contact portion and extending out of the base portion, and an intermediate portion extending between the contact portion and the tail portion, and for each conductive element, the intermediate portion comprises the first section held in the base portion and the second section held by the tongue portion.

5. The connector of claim 1, wherein:

the lossy material is coupled to the ground conductors along the entire length of the base portion in the mating direction.

6. The connector of claim 1, wherein:

the plurality of slots of the housing comprise a first row of slots disposed along a first surface of the tongue portion and a second row of slots disposed along a second surface of the tongue portion, the second surface opposite the first surface, the housing comprises a chamber disposed between the first row of slots and the second row of slots, and the lossy material is disposed in the chamber.

7. The connector of claim 1, wherein:

the tongue portion of the housing comprises a platform comprising a raised surface, and the lossy material comprises a corresponding platform such that the lossy material is brought closer to the conductive elements held in the slots extending on the raised surface of the platform of the tongue portion of the housing than without the corresponding platform of the lossy material.

8. The connector of claim 1, wherein:

the signal conductors are disposed in pairs separated by the ground conductors, and the lossy material comprises portions protruding towards spaces between the signal conductors of the pairs.

9. An electrical connector comprising:

a housing comprising a base portion extending in a longitudinal direction, a tongue portion extending from the base portion in a mating direction perpendicular to the longitudinal direction, and a plurality of slots extending through the base portion to surfaces of the tongue portion;

a plurality of conductive elements each held by one slot of the plurality of slots of the housing, the plurality of conductive elements comprising a plurality of pairs of signal conductors separated by ground conductors; and a lossy material disposed in the housing, wherein, for each pair of signal conductors, the lossy material comprises a portion protruding towards a space between the signal conductors of the pair.

10. The connector of claim 9, wherein:

the lossy material spans a joint between the base portion and the tongue portion.

11. The connector of claim 9, wherein:

the lossy material is molded to the housing in a joint between the base portion and the tongue portion.

12. The connector of claim 9, wherein:

for each pair of signal conductors, the portion of the lossy material protruding towards the space between the signal conductors of the pair extends along the entire length of the base portion in the mating direction.

13. The connector of claim 9, wherein:

for each pair of signal conductors, the portion of the lossy material protruding towards the space between the signal conductors of the pair has a dovetail-shaped cross-section.

14. The connector of claim 9, wherein:

the lossy material comprises protrusions elongating in the mating direction and coupled to the ground conductors.

15. The connector of claim 14, wherein:

the portions of the lossy material protruding towards the spaces between the signal conductors of the pairs are disposed between the protrusions coupled to the ground conductors.

16. The connector of claim 15, wherein:

the portions of the lossy material protruding towards the spaces between the signal conductors of the pairs are shorter than the protrusions coupled to the ground conductors in the mating direction.

17. An electrical connector comprising:

a housing comprising a base portion extending in a longitudinal direction, a tongue portion extending from the base portion in a mating direction perpendicular to the longitudinal direction; and a plurality of conductive elements each comprising a contact portion extending in the mating direction and a tail portion opposite the contact portion and extending out of the base portion, the plurality of conductive elements comprising a first plurality of conductive elements and a second plurality of conductive elements, wherein:

the tail portions of the first plurality of conductive elements jog towards the second plurality of conductive elements, the tail portions of the second plurality of conductive elements jog towards the first plurality of conductive elements, the housing comprises a first row of slots extending through the base portion to a first surface of the tongue portion, and a second row of slots extending through the base portion to a second surface of the tongue portion, and the first plurality of conductive elements each is disposed in one slot of the first row of slots and the second plurality of conductive elements each is disposed in one slot of the second row of slots.

18. The connector of claim 17, wherein:

the tail portions of the plurality of conductive elements comprise mounting surfaces aligned on a same plane.

19. The connector of claim 18, wherein:

the plurality of conductive elements each comprises an intermediate portion extending between the contact portion and the tail portion, and for each of the plurality of conductive elements, the tail portion comprises a straight section extending from the intermediate portion, an end section comprising the mounting surface, and a transition section extending between the straight section and the end section.

20. The connector of claim 19, wherein:

the transition sections of the plurality of conductive elements are of a same length.

21. The connector of claim 1, wherein:

the plurality of slots comprise a first row of slots extending through the base portion to a first surface of the tongue portion, and a second row of slots extending through the base portion to a second surface of the tongue portion, the plurality of conductive elements comprises a first plurality of conductive elements and a second plurality of conductive elements, and the first plurality of conductive elements each is disposed in one slot of the first row of slots and the second plurality of conductive elements each is disposed in one slot of the second row of slots.

22. The connector of claim 17, comprising:

a lossy material disposed in the housing and elongating in the longitudinal direction between the first plurality of conductive elements and the second plurality of conductive elements.

23. The connector of claim 17, wherein:

the tongue portion of the housing comprises a platform comprising a raised surface, and the contact portions of selected ones of the first plurality of conductive elements are disposed on the raised surface.

* * * * *